United States Patent
Kim et al.

(10) Patent No.: US 9,699,543 B2
(45) Date of Patent: Jul. 4, 2017

(54) MOBILE TERMINAL AND METHOD FOR CONTROLLING THE SAME

(71) Applicant: LG ELECTRONICS INC., Seoul (KR)

(72) Inventors: Yongsin Kim, Seoul (KR); Jongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 14/528,912

(22) Filed: Oct. 30, 2014

(65) Prior Publication Data
US 2015/0304757 A1 Oct. 22, 2015

(30) Foreign Application Priority Data
Apr. 17, 2014 (KR) .......................... 10-2014-0046165

(51) Int. Cl.
*H04R 1/10* (2006.01)
*H02J 7/00* (2006.01)
(Continued)

(52) U.S. Cl.
CPC .............. *H04R 1/1041* (2013.01); *H02J 7/00* (2013.01); *H02J 7/0011* (2013.01);
(Continued)

(58) Field of Classification Search
CPC ........... H04M 1/72527; H04M 1/6075; H04M 1/0262; H04M 19/08; H04M 1/00;
(Continued)

(56) References Cited

U.S. PATENT DOCUMENTS

| 8,134,593 B2 * | 3/2012 | Otsuki | ................. H01M 10/44 200/61.7 |
| 2003/0211869 A1 * | 11/2003 | Lee | ...................... H04M 1/725 455/572 |

(Continued)

FOREIGN PATENT DOCUMENTS

| KR | 10-2006-0085325 A | 7/2006 |
| KR | 10-2007-0050743 A | 5/2007 |
| KR | 10-2009-0013416 A | 2/2009 |
| KR | 10-1144271 B1 | 5/2012 |
| KR | 10-2013-0030736 A | 3/2013 |

*Primary Examiner* — Vivian Chin
*Assistant Examiner* — Ubachukwu Odunukwe
(74) *Attorney, Agent, or Firm* — Birch, Stewart, Kolasch & Birch, LLP

(57) ABSTRACT

A mobile terminal having a terminal body, an audio output module located in the terminal body, a power supply unit located in the terminal body, an earphone port formed on one side of the terminal body and a controller configured to, when a plug of earphone having a cable-type battery is inserted into the earphone port while performing an audio output function, to select an audio output path for at least one of the audio output module or the earphone inserted in the earphone port to output audio sound according to the audio output function and to charge the power supply unit by the cable-type battery is provided. Accordingly, an audio sound can be output through an audio output path selected according to the intention of the user who has inserted the earphone having the cable-type battery.

16 Claims, 27 Drawing Sheets

(51) Int. Cl.
*H01M 10/00* (2006.01)
*H04R 5/04* (2006.01)

(52) U.S. Cl.
CPC .......... *H04R 1/1025* (2013.01); *H01M 10/00* (2013.01); *H04R 5/04* (2013.01); *H04R 2420/05* (2013.01)

(58) Field of Classification Search
CPC ... H04B 1/3877; H04B 1/3883; H04W 88/02; H04W 52/02; H04W 4/00; Y02E 60/12; H02J 17/00; H02J 7/0044; H02J 7/00; H02J 7/0011; H04R 1/10; H04R 5/033; H04R 1/1025; H04R 1/1041; H04R 3/00; H04R 29/001; G06F 13/20; H01M 10/00
USPC .... 381/74, 58, 384, 123; 455/573, 572, 557, 455/559, 414.1; 320/114; 710/316
See application file for complete search history.

(56) References Cited

U.S. PATENT DOCUMENTS

| | | | |
|---|---|---|---|
| 2005/0077870 A1* | 4/2005 | Ha | H02J 7/0055 320/114 |
| 2007/0104333 A1* | 5/2007 | Kuo | H04R 1/1025 381/74 |
| 2012/0009906 A1* | 1/2012 | Patterson | H04M 1/72519 455/414.1 |
| 2012/0159036 A1* | 6/2012 | Kim | G06F 13/4022 710/316 |
| 2013/0315406 A1* | 11/2013 | Choi | H04R 29/001 381/58 |
| 2014/0199568 A1 | 7/2014 | Kwon et al. | |
| 2014/0254838 A1* | 9/2014 | Lee | H04R 3/00 381/123 |

\* cited by examiner

FIG. 4
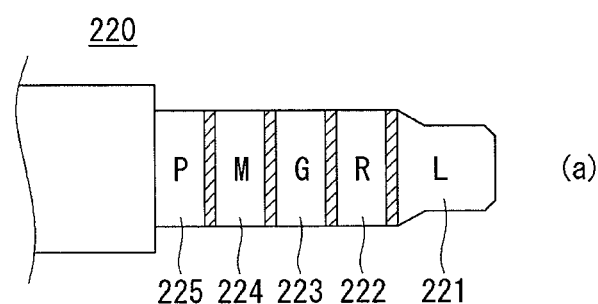
(a)
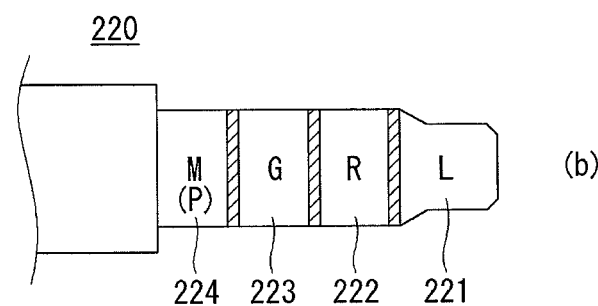
(b)

FIG. 8
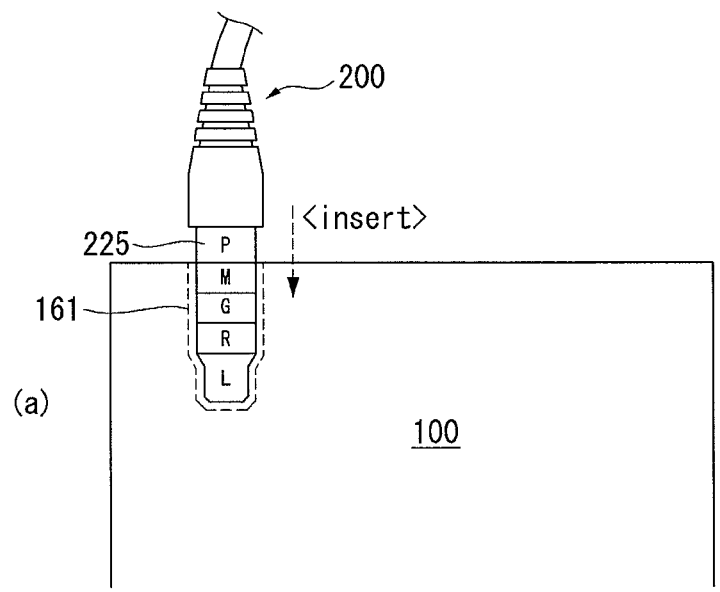
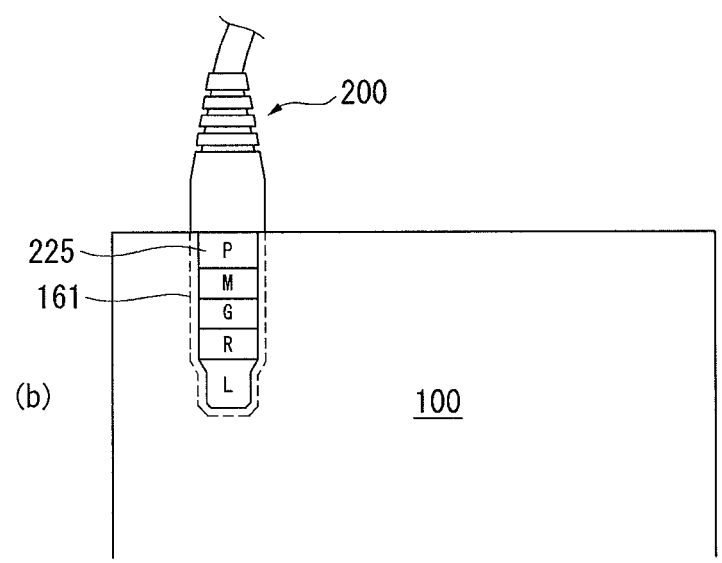

FIG. 10
(a)
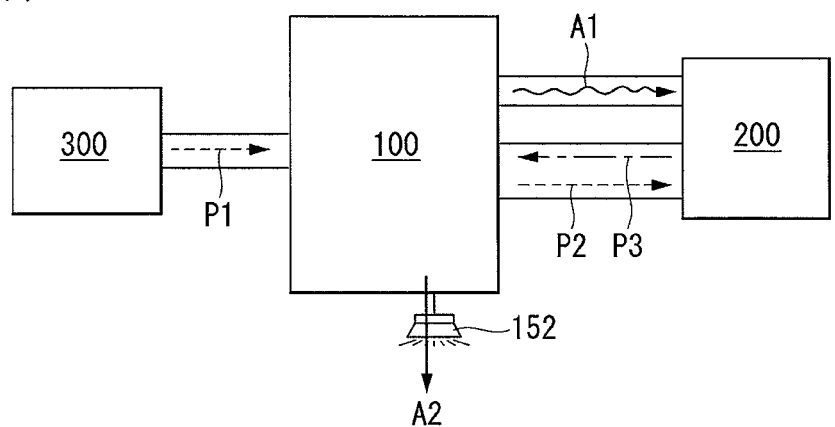
(b)
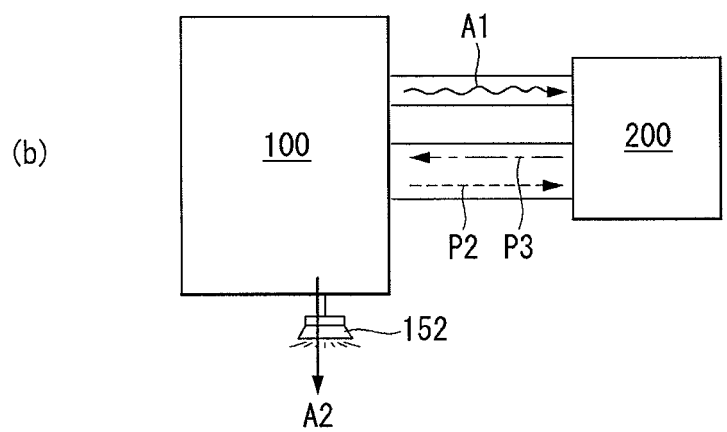

MOBILE TERMINAL AND METHOD FOR CONTROLLING THE SAME

CROSS-REFERENCE TO RELATED APPLICATIONS

This application claims priority to Korean Patent Application No. 10-2014-0046165, filed in the Republic of Korea on Apr. 17, 2014, the entire contents of which is hereby incorporated by reference in its entirety.

BACKGROUND OF THE INVENTION

1. Field of the Invention

The present invention relates to a mobile terminal and a method for controlling the mobile terminal.

2. Related Art

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Meanwhile, the mobile terminal is a portable device receiving power through a detachable battery. A secondary battery can be used for the portable terminal. Secondary batteries of today are used for the applications requiring low power consumption. Example applications of the secondary battery include car ignition devices, portable devices, gadgets, and uninterruptable power supplies.

Demand for secondary batteries is growing fast due to the recent advancement of wireless communication technology. In most instances, secondary batteries are fabricated in a cylinder shape, square shape, or pouch shape. This variety of battery shape is ascribed because secondary batteries are fabricated by installing an electrode assembly consisting of cathode, anode, and membrane inside a metal can of cylinder or square shape or inside a pouch-type case made of aluminum laminate sheet, and injecting electrolyte into the electrode assembly. Therefore, because a separate space for secondary battery is necessary, the secondary battery limited to the shape of a cylinder, square, or pouch may become an obstacle for development of portable devices of various shapes. In this regard, there is growing demand for a new type of secondary battery whose shape can be easily changed so that the secondary battery can be applied to portable terminals in various ways.

SUMMARY OF THE INVENTION

Accordingly, an object of the present invention is to address the above-noted and other problems.

An object of the present invention is to provide a mobile terminal for controlling an audio output of the mobile terminal by using earphones with a cable-type battery and a method for controlling the mobile terminal.

Another object of the present invention is to provide a mobile terminal capable of outputting an audio sound through an audio output path based on the user's intention by properly interpreting the intention of the user who uses earphones with a cable-type battery for the mobile terminal and a method for controlling the mobile terminal.

A mobile terminal according to one aspect of the present invention includes a terminal body, an audio output module located in the terminal body, a power supply unit located in the terminal body, an earphone port formed on one side of the terminal body and a controller configured to, when a plug of earphone having a cable-type battery is inserted into the earphone port while performing an audio output function, to select an audio output path for at least one of the audio output module or the earphone inserted in the earphone port to output audio sound according to the audio output function and to charge the power supply unit by the cable-type battery.

A method for controlling a mobile terminal according to one aspect of the present invention includes detecting insertion of a plug of an earphone with a cable-type battery into an earphone port formed on one side of a body of the mobile terminal, performing an audio output function while a power supply unit of the mobile terminal is charged through the cable-type battery, selecting either of an audio output module of the mobile terminal or the earphone to output audio sound and outputting the audio sound through a selected audio output module or earphone.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4 includes overviews illustrating an example of a plug of an earphone with a cable-type battery according to one embodiment of the present invention;

FIG. 8 is an overview illustrating the step of S100 of FIG. 7;

FIG. 10 is an overview illustrating a structure according to one embodiment of the present invention, which enables an earphone with a cable-type battery to perform both a charging and an audio output function of a mobile terminal;

DESCRIPTION OF EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
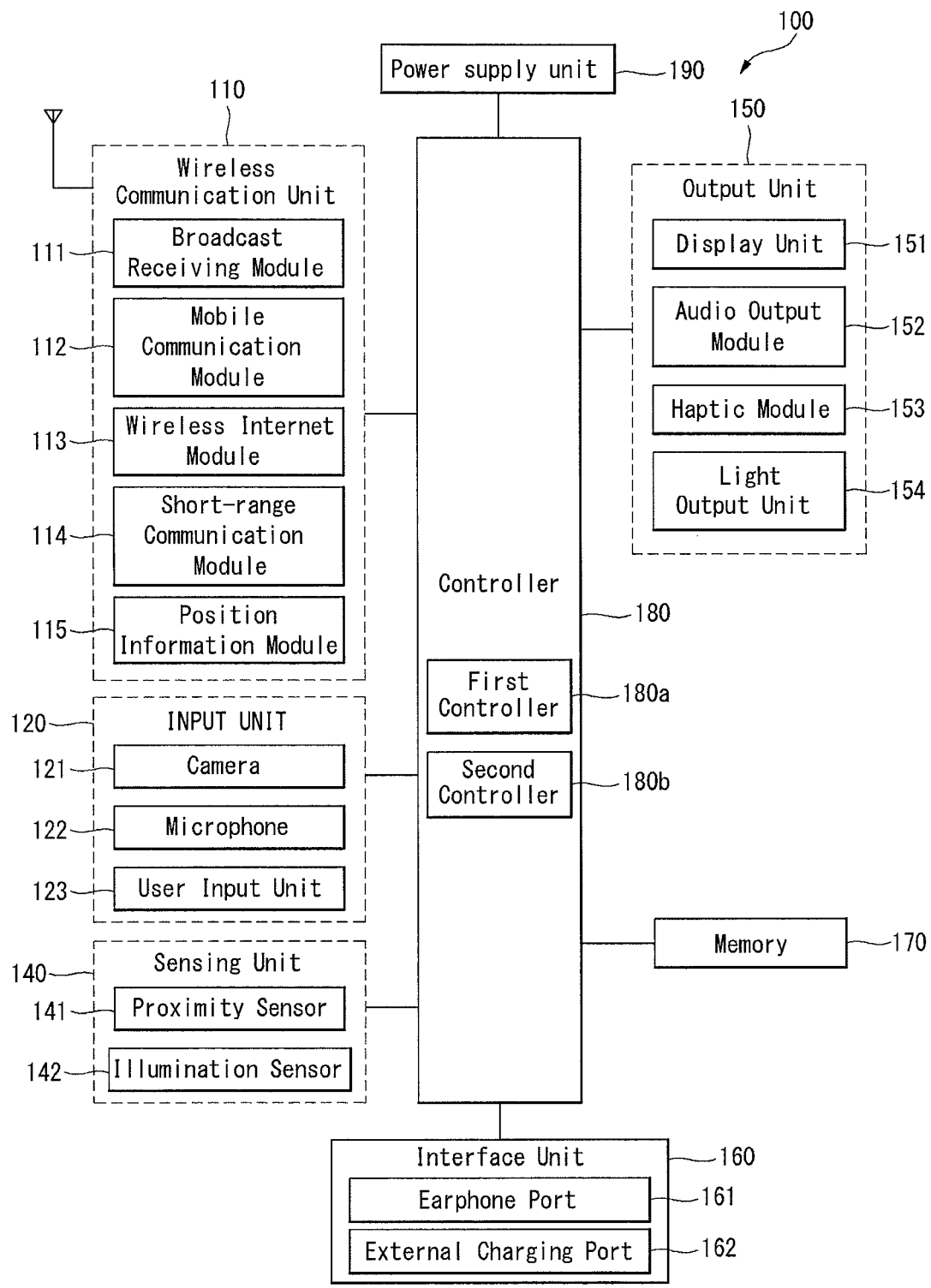
FIG. 1 is a block diagram of a mobile terminal according to an embodiment of the present invention.
Figure 2:
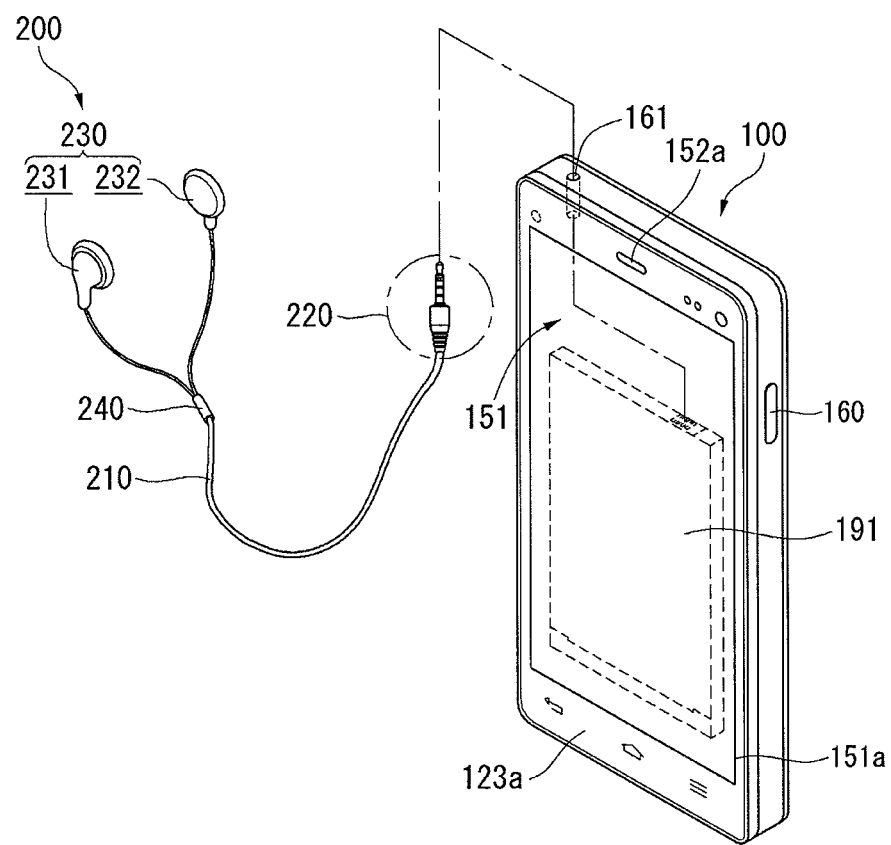
FIGS. 2 and 3 are conceptual views of one example of the mobile terminal, viewed from different directions.
Figure 3:
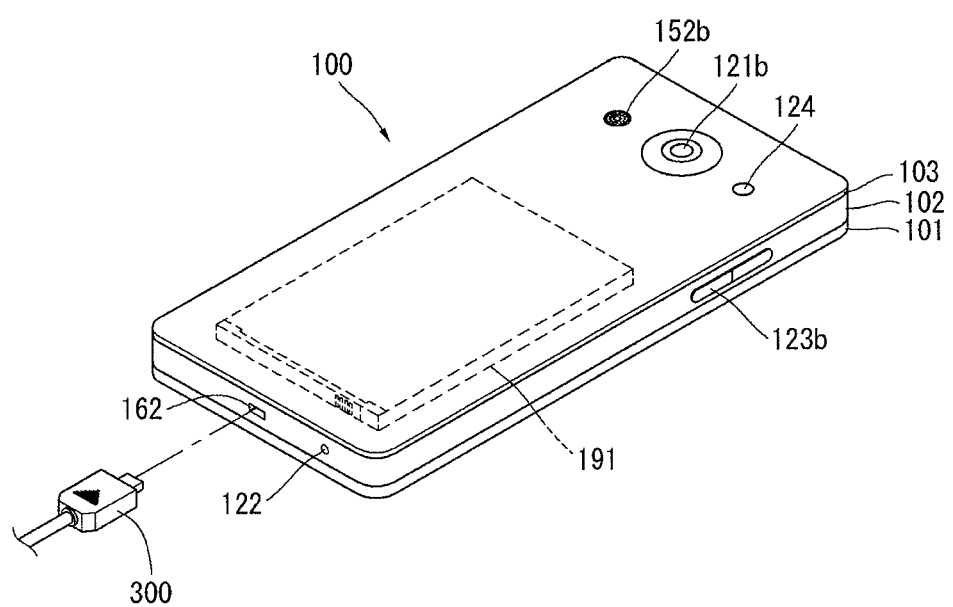

Reference is now made to FIGS. 1-3, where FIG. 1 is a block diagram of a mobile terminal according to an embodiment of the present invention, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio sound, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and a light output unit 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160. In the embodiment shown, the interface unit 160 includes an earphone port 161 and an external charging port 162.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The controller 180 may include a main processor or first controller 180a and a sub-processor or second processor 180b. The main processor 180a can control the operation of each constituting element during operation of the mobile terminal 100 by supplying power to the constituting elements of the mobile terminal 100 of FIG. 1 through the power supply unit 190. Meanwhile, the sub-processor 180b can control only the audio output function from the mobile terminal 100 when an earphone with a cable-type battery is inserted into the earphone port 161 while the mobile terminal 100 is turned off. The sub-processor 180b can be driven by stand-by power while the mobile terminal 100 is turned off.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. Meanwhile, according to one embodiment of the present invention, when an earphone with a cable-type battery is inserted into the earphone port 161, the controller 180 can control the mobile terminal 100 so that at least one of the power supply unit 190 and the cable-type battery can supply power to the mobile terminal 100 to execute a particular function of the mobile terminal 100.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

With reference to FIG. 2, the mobile terminal 100 can include an earphone port 161 on one side of the mobile terminal 100, into which a plug 220 of an earphone 200 is inserted. The mobile terminal 100 can transmit an audio sound to the earphone 200 through the earphone port 161 and receive a voice signal from the earphone 200. The earphone port 161 can be formed on an upper surface of the case of the mobile terminal 100. According to one embodiment of the present invention, the mobile terminal 100 can use the earphone 200 as an auxiliary battery and receive power from the earphone 200 to operate the mobile terminal 100. The earphone 200 can connect a plug 220, a speaker 230, a microphone 240, and the constituting elements together and includes an earphone cable 210 with a cable-type battery. The plug 220 is connected to the earphone port 161 of the mobile terminal 100. The speaker 230 can include a left speaker 231 outputting a left audio sound and a right speaker 231 outputting a right audio sound 240. The microphone can transmit a received voice signal to the mobile terminal 100.

According to one embodiment of the present invention, the earphone 200 can be inserted into the earphone port 161 to charge the power supply unit 190 through the cable-type battery embedded in the earphone. The cable-type battery can directly charge a battery detachable from the mobile terminal 100 or carry out a predetermined function by supplying power directly to at least part of constituting elements of the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a unitary body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, alternative arrangements are possible and within the teachings of the present invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. In such an arrangement, the touch screen may serve as the user input unit 123 (see FIG. 1). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The light output unit 154 can be configured to output light for indicating an event generation. Examples of such events include a message reception, a call signal reception, a missed call, an alarm, a schedule notice, an email reception, information reception through an application, and the like. When a user has checked a generated event, the controller can control the light output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123 (FIG. 1), which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123 (FIG. 1), a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth® port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject. The second audio output module 152b can be located on the rear of the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable, such as charging cable 300, connected to the external charging port 162. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

According to one embodiment of the present invention, a plug of an earphone with a cable-type battery is inserted into the earphone port 161 of the mobile terminal 100, and power is supplied to the mobile terminal 100 through the cable-type battery. The structure and the function of the earphone plug can be modified so that the earphone can be used as an auxiliary battery for the mobile terminal 100 as well as an audio output path of the mobile terminal 100, which will be described with reference to FIGS. 4 to 5.

FIG. 4 illustrates an example of a plug of an earphone with a cable-type battery according to one embodiment of the present invention. The plug 220 of an earphone with a cable-type battery can include a left audio out (L) 221, right audio out (R) 222, ground (G) 223, microphone (M) 224, and power (P) terminal 225. In contrast to such an earplug, a standard 4-pole earphone plug comprises L, R, G, and M terminals. If an earphone according to one embodiment of the present invention needs to supply power to the mobile terminal 100 in addition to the related art audio output function, the power terminal (P) is implemented additionally (see FIG. 4(a)).

As shown in FIG. 4(a), the power (P) terminal can be implemented by adding the power (P) terminal to the standard 4-pole plug. However, any one terminal of the standard 4-pole plug can be modified to support two functions at the same terminal. For example, with reference to FIG. 4(b), the standard 4-pole plug can be re-designed to divide the microphone pole so that the microphone pole (M) and the power pole (P) can be implemented in the same terminal. The earphone 200 with a cable-type battery according to one embodiment of the present invention includes a microphone 240, where the microphone module can include a control mechanism (for example, a play button, stop button, and so on) to control the audio output from the mobile terminal 100 in addition to the microphone 240. When the earphone 200 performs the function of a microphone or is not used for controlling the audio output function of the mobile terminal 100, the earphone 200 can supply power to the mobile terminal 100 through the power pole (P).

While the examples above assume that a cable-type battery supplies power to the mobile terminal 100 or charges the mobile terminal 100, power of the mobile terminal 100 can be transmitted to the earphone 200 with a cable-type battery through the power (P) terminal shown in FIG. 4. In other words, the earphone with a cable-type battery applied to the implementation of one embodiment of the present invention can be inserted into the mobile terminal 100 so that both of charging and discharging function can be performed.

Now an example of supplying power to the mobile terminal 100 through an earphone with a cable-type battery according to one embodiment of the present invention will be described in more detail with reference to FIG. 5. For the convenience of description, it is assumed that the plug of an earphone with the cable-type battery has the structure of FIG. 4(*a*).

Figure 5:
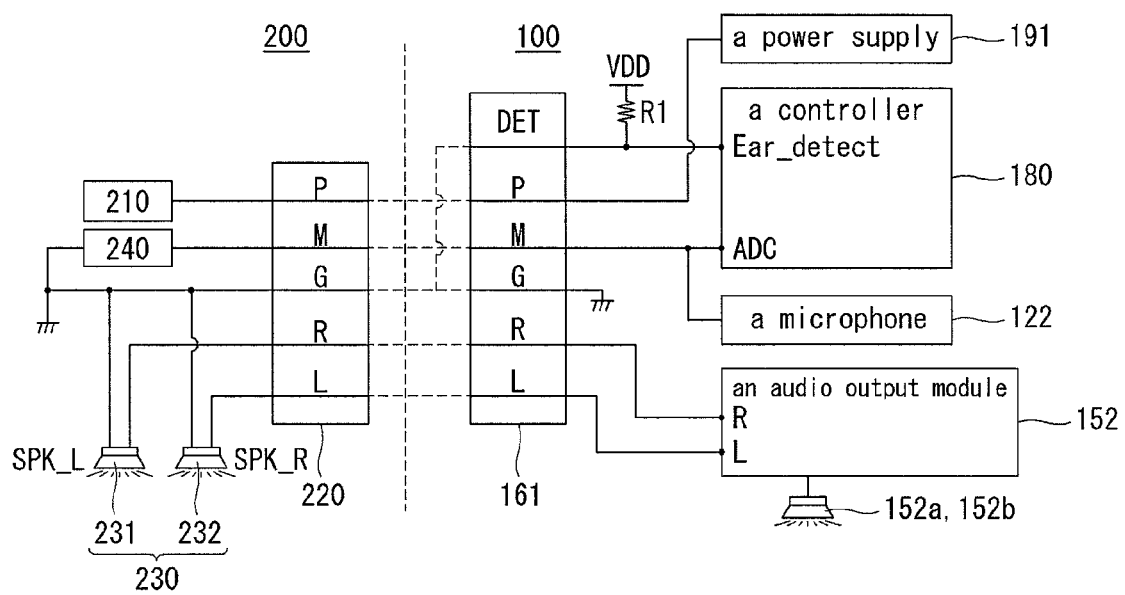
FIG. 5 is a circuit diagram illustrating an interface of an earphone port of a mobile terminal according to one embodiment of the present invention and an interface through which an earphone with a cable-type battery is connected to the earphone port.

FIG. 5 illustrates an interface of an earphone port of a mobile terminal according to one embodiment of the present invention and an interface through which an earphone with a cable-type battery is connected to the earphone port. With reference to FIG. 5, the earphone 200 with a cable-type battery applied to implement one embodiment of the present invention can include a plug 220, a speaker 230, a microphone 240, and a cable-type battery 210 while the mobile terminal 100 can include an earphone port 161, a microphone 122, an audio output module 152, a controller 180, and a power supply 191.

The cable-type battery can be embedded in the earphone cable 210, and for the convenience of description, reference symbols of the cable-type battery use the same symbol for the earphone cable 210. The earphone cable 210 can have a data cable for transmitting and receiving data to and from the mobile terminal 100 separately in addition to the cable-type battery structure.

The plug of the earphone 200 is a device intended to be used as an interface with the mobile terminal 100. The plug 200 comprises a microphone (M), ground (G), right audio out (R), left audio out (L), and power (P) terminal. Since description of the plug 200 of the earphone has been already given with reference to FIG. 4, further description thereof will be omitted. The earphone port 161 of the mobile terminal 100 is a device intended to be used as an interface with the earphone 200. Similar to the plug 220 of the earphone 200, the earphone port 161 can comprise a microphone (M), ground (G), right audio out (R), left audio out (L), and power (P) terminal. The earphone port 161 can further comprise a detection (DET) terminal meant for detecting insertion of the earphone 200.

The ground (G) of the earphone port 161 is grounded; the right audio out (R) terminal of the earphone port 161 is connected to the right audio out (R) terminal of the audio output module 152; and the left audio out (L) terminal of the earphone port 161 is connected to the left audio out (L) terminal of the audio output module 152.

The detection (DET) terminal of the earphone port 151 is connected to a pull-up resistor R1. The DET terminal is left open when the earphone 200 is not inserted. The DET terminal is connected to the ground (G) of the earphone 200 when the earphone 200 is inserted. The power (P) terminal of the earphone port 161 is connected to the power supply unit 190 of the mobile terminal 100. The mobile terminal 100 can receive power from the cable-type battery 210 through the power (P) terminal, or the power supply unit 190 can supply power to the cable-type battery 210 through the power (P) terminal.

The audio output module 152 can be made of audio components which transmit and receive an audio sound; and encode and decode the audio sound. The audio output module 152 can comprise a codec and an audio amplifier. The audio output module 152 is connected to the microphone (122 of FIG. 1) and the speaker 152*a*, 152*b* installed inside the mobile terminal 100. The audio output module 152 converts an analog voice signal received from the microphone 122 of the mobile terminal 100 or the microphone 240 of the earphone 200 into a digital voice signal. The audio output module 152 transmits the digitized voice signal to the controller 180, converts a digital voice signal input from the controller 180 into an analog voice signal, and outputs the analog voice signal through the speaker 152*a*, 152*b* of the mobile terminal 100 or the speaker 230 of the earphone 200.

Also, the audio output module 152 of the mobile terminal 100 can output various audio sounds generated by the mobile terminal 100 through the speaker 152*a*, 152*b* of the mobile terminal 100 or the speaker 230 of the earphone 200. For example, the audio output module 152 can output an audio sound generated from playing of an MP3 file or a video file through the speaker 152*a*, 152*b* of the mobile terminal 100 or the speaker 230 of the earphone 200. To this purpose, the audio output module 152 can include the left audio out (L) and the right audio out (R) terminal.

The controller 180, being connected to the detection (DET) terminal of the earphone port 161, includes an earphone detection (Ear_Detect) terminal which monitors insertion of the earphone 200 and an analog digital converter (ADC) which is connected to the microphone of the earphone port 161. When a high signal (for example, 3V) is input to the earphone detection (Ear_detect) terminal by the power supply (VDD), the controller 180 determines that an earphone 200 has been inserted. When the detection (DET) terminal of the earphone port 161 is connected to the ground (G) and a low signal (for example, 0V) is input to the earphone detection (Ear_detect) terminal, the controller 180 determines that the earphone 200 has not been inserted.

Meanwhile, according to one embodiment of the present invention, if insertion of the earphone 200 is detected, the controller 180 can control the power supply unit 190 to operate in a mode where the cable-type battery 210 charges the power supply unit 190. Further, if the mobile terminal 100 is performing an audio output function in the middle of charging the cable-type battery 210, the controller 180 can control the audio sound to be output through either of the audio output module 152 and the speaker 230 of the earphone 200.

The audio output module 152 of the mobile terminal 100 or the speaker 230 of the earphone 200 can be selected manually as the audio output path by the user when the audio sound is output or selected automatically by interpreting the intention of the user when the audio sound is output. For example, when the user wants to use the earphone 200 as an auxiliary battery rather than an audio output mechanism while the earphone 200 is inserted into the earphone port 161 of the mobile terminal 100, the intention of the user can be properly interpreted to output an audio sound through the speaker of the mobile terminal 100.

Figure 6:
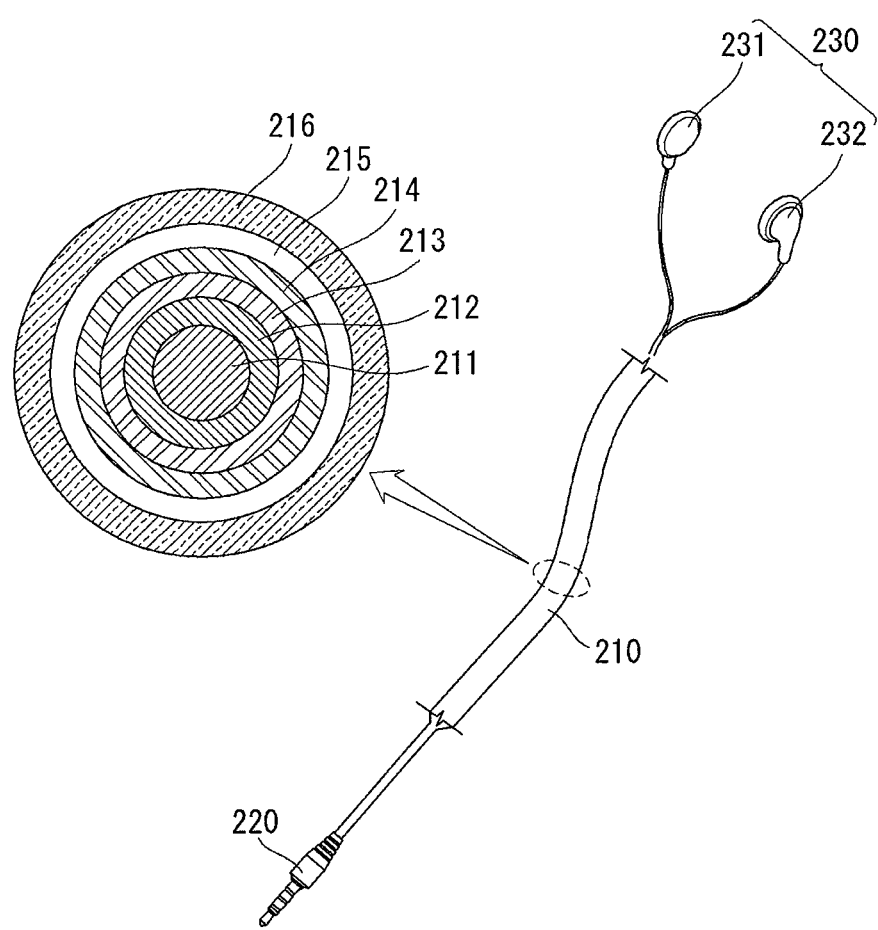
FIG. 6 is an overview illustrating one cross section of a cable of an earphone with a cable-type battery applied to one embodiment of the present invention.

Next, FIG. 6 illustrates one cross section of a cable of an earphone with a cable-type battery applied to one embodiment of the present invention. The earphone 200 applied to implement one embodiment of the present invention can have a cable-type battery within the earphone cable 210. The cable-type battery is detailed in Korean Published Patent Application No. 10-2012-0019977, which is incorporated by reference herein, and the cross section of the cable-type battery will be described briefly with reference to FIG. 6.

The cable-type secondary battery 210 includes an anode current collector 211 which has a cross section of a predetermined shape and extends in a longitudinal direction; an anode active material pattern layer 212 which is formed by anode active material patterns spaced apart from one another by a predetermined interval on the outer surface of the anode current collector; an electrolyte layer 213 which surrounds the anode active material pattern layer and provides an ion-filled channel; a cathode active material pattern layer 214 which is formed by the cathode active material patterns spaced apart from one another by a predetermined interval at the locations corresponding to the anode active material patterns on the outer surface of the electrolyte layer; and a cathode current collector 215 which surrounds the outer surface of the cathode active material pattern layer. The term of predetermined shape indicates that no particular shape is preferred; therefore, an arbitrary shape can be used as long as the shape does not impair the technical principles of the present invention. The cable-type battery of the present invention has a horizontal cross section of a predetermined shape, a linear structure which extends in a longitudinal direction with respect to the horizontal cross section, and flexibility, thereby being capable of changing its shape freely.

The cable-type battery 210 can have a protective sheath 216. The protective sheath 216, made of insulating material, is formed on the outer surface of the cathode current collector 215 to protect electrodes against moisture in the air and an external shock. The protective sheath 216 is made usually from polymer resin, including PVC, HDPE, and epoxy resin.

The cross sectional structure of the cable-type battery 210 has been described; however, the present invention is not limited to just this configuration of a cable-type battery described above. For example, additional flexibility can be obtained from the cable-type battery structure and various problems due to the additional flexibility can be dealt with by applying an appropriate change to the structural design of the cable-type battery.

For purposes of the following explanations, it is assumed that an earphone with a cable-type battery is inserted into the mobile terminal 100 and, in the middle of charging the mobile terminal 100, an audio output function is performed in the mobile terminal 100. A method for outputting an audio sound through one of audio output paths between an earphone and a speaker of the mobile terminal under the aforementioned situation will be described with reference to related drawings.

Figure 7:
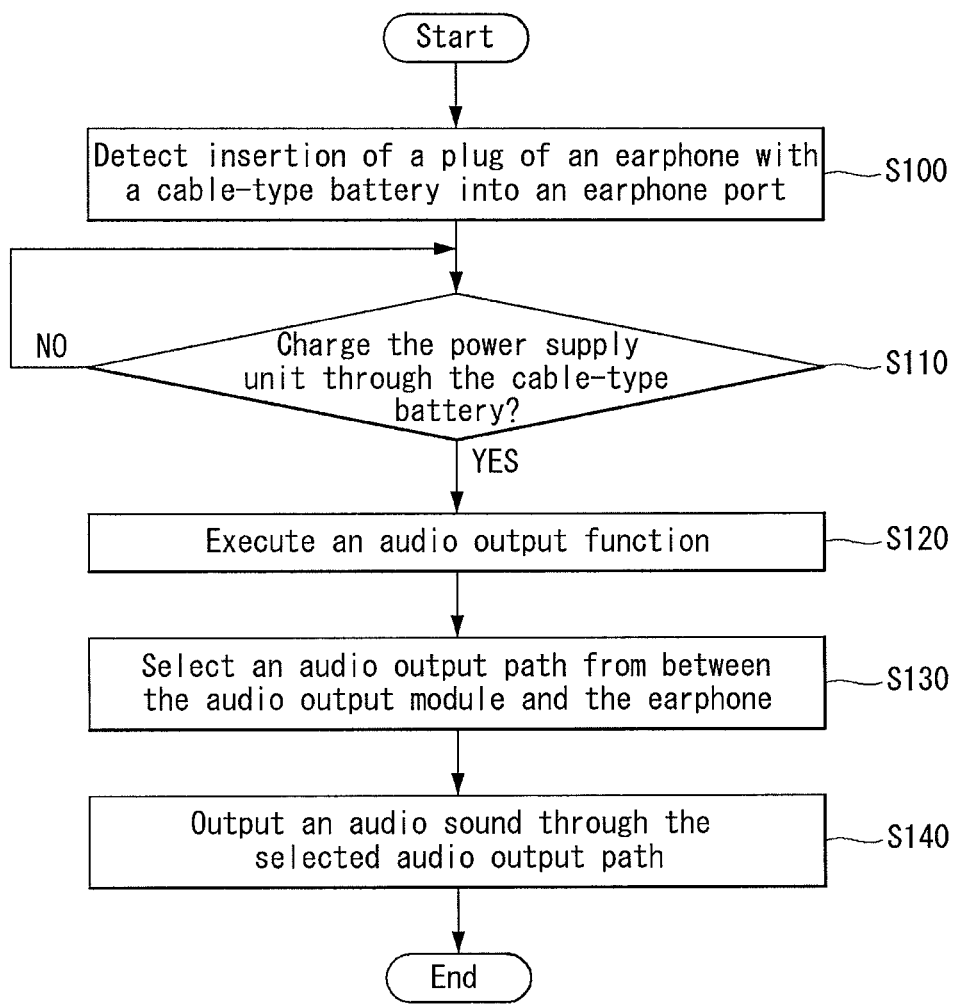
FIG. 7 is a flow diagram illustrating a method for controlling a mobile terminal according to one embodiment of the present invention.

FIG. 7 is a flow diagram illustrating a method for controlling a mobile terminal according to one embodiment of the present invention. A method for controlling a mobile terminal according to one embodiment of the present invention can be realized by the mobile terminal 100 and an earphone 200 with a cable-type battery described with reference to FIGS. 1 to 6.

With reference to FIG. 7, the controller 180 can detect insertion of the plug of an earphone with a cable-type battery into an earphone port (S100). When the earphone is inserted, an external charger may or may not be connected to the mobile terminal 100.

When an external charger is connected to the external charger port of the mobile terminal when the earphone is inserted, the power supply unit 190 of the mobile terminal 100 can be charged by the external charger. At the same time, the mobile terminal 100 can supply or receive power to and from the cable-type battery. For example, if the earphone 200 is inserted, the mobile terminal 100 checks the power supply unit 190 for the remaining battery life, and if the remaining battery life is more than a predetermined amount, power can be supplied to the cable-type battery. Similarly, when the amount of remaining battery life of the power supply unit 190 is smaller than a predetermined amount, power can be supplied from the cable-type battery. In this instance, the mobile terminal 100 can check the amount of remaining battery life of the cable-type battery to determine a charging direction.

At this time, the charging direction can be either a first charging direction from the power supply unit 190 of the mobile terminal 100 to the cable-type battery 210 of the earphone 200 or a second charging direction from the cable-type battery 210 of the earphone 200 to the power supply unit 190 of the mobile terminal 100. For the convenience of description, one embodiment of the present invention assumes the second charging direction where an earphone is inserted into the mobile terminal and the cable-type battery of the earphone supplies power to the mobile terminal. However the present invention is not limited to the above assumption.

The controller 180 checks whether the power supply unit 190 of the mobile terminal 100 is charged through the cable-type battery 210 of the earphone 200 (S110). The controller 180 receives an input for carrying out an audio output function while the power supply unit 190 is charged through the cable-type battery (S120). The audio output function can include at least one of playing a music file, receiving an incoming call, and generating an alarm. The controller 180 selects an audio output path from between the audio output module embedded in the mobile terminal 100 and the earphone (S130). Further, the controller 180 can select the audio output path automatically by interpreting the user's intention for using the earphone or based on the selection input provided by the user.

The controller 180 can output an audio sound through the selected audio output path (S140). For example, when the mobile terminal 100 receives an input for playing an MP3 file stored in the memory 170 of the mobile terminal 100, receives a request for connecting to an incoming call from the outside, or attempts to output an alarm set by the user through a bell sound, the mobile terminal 100 outputs a predetermined sound to the outside. At this time, if an earphone is inserted into the mobile terminal, the sound is normally output through the speaker of the earphone. However, according to one embodiment of the present invention, insertion of the earphone to the earphone port of the mobile terminal is intended to use the earphone as an auxiliary battery for charging the mobile terminal in addition to audio output. Accordingly, it is necessary to select an appropriate audio output path according to the intention of the user and output a sound by using the selected audio output path.

Individual steps of the embodiment described through FIG. 7 will be described in more detail with reference to related drawings. FIG. 8 illustrates (S100) of FIG. 7. With reference to FIG. 8, the plug 220 of an earphone with a cable-type battery can include multiple terminals (L), (R), (G), (M), and (P) as shown in FIG. 4. In order for the earphone to be used as an auxiliary battery, power (P) terminal has to be inserted completely into the earphone port 161. In other words, as shown in FIG. 5, the earphone detection (DET) terminal formed at the earphone port 161 can recognize insertion of the earphone 200 into the earphone port 161 once the power (P) terminal of the plug 220 is inserted fully into the earphone port 161.

As shown in FIG. 8(a), an audio sound generated in the mobile terminal 100 can be output through the speaker of the earphone even for the case where the earphone is inserted into the earphone port 161 up to the microphone (M) terminal of the plug 220. However, when the audio output function is performed while the mobile terminal 100 is charged through the cable-type battery according to one embodiment of the present invention, the step of selecting an audio output path can be performed when the power (P) terminal of the earphone plug 200 is fully inserted into the earphone port 161.

Figure 9:
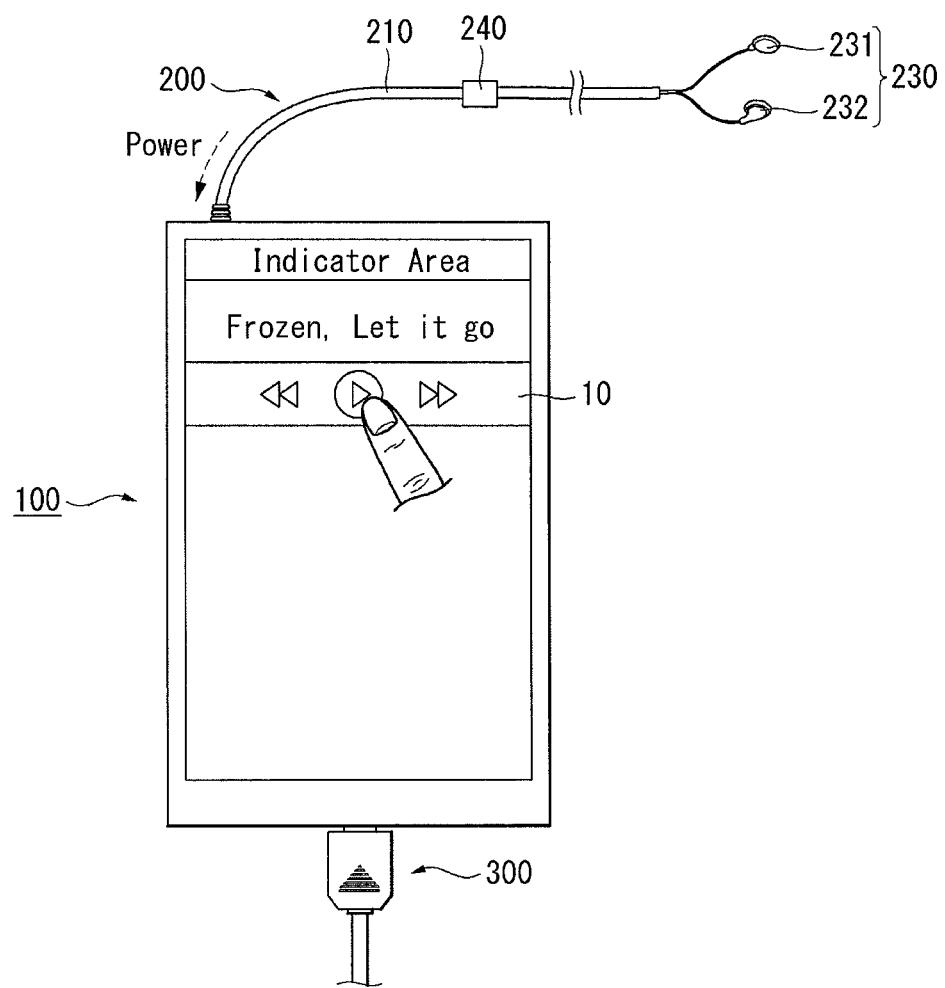
FIG. 9 is an overview illustrating the steps of S110 and S120 of FIG. 7.

FIG. 9 illustrates (S110) and (S120) of FIG. 7. With reference to FIG. 9, the controller 180 can receive an input for playing an MP3 file while the power supply unit 190 is charged through a cable-type battery ((S110) of FIG. 7: YES). For example, while a control area 10 for controlling play of an MP3 file is displayed on the display unit 151, the controller 180 can receive an input with respect to a play button. According to the result of plying the MP3 file, the controller 180 can either output an audio sound through the speaker 230 of the earphone or output through the speaker embedded in the mobile terminal 100.

FIG. 10 illustrates a structure according to one embodiment of the present invention, which enables an earphone with a cable-type battery to carry out both of a charging and an audio output function of a mobile terminal. With reference to FIG. 10(a), if an external charging cable 300 is connected to the mobile terminal 100, a first power signal P1 is delivered to the mobile terminal 100, after which the mobile terminal 100 can be charged. Also, if an earphone 200 with a cable-type battery 210 is connected to the mobile terminal 100, a second power signal P2 is delivered to the earphone 200, which enables the cable-type battery 210 to be charged. Similarly, the mobile terminal 100 can be charged as a third power signal P3 is delivered from the cable-type battery 210 to the mobile terminal 100.

In addition, the mobile terminal 100 according to one embodiment of the present invention can output a first audio sound A1 through the earphone speaker while being charged through the earphone 200. Similarly, while being charged through the earphone 200, the mobile terminal 100 can output a second audio sound A2 through the speaker of the mobile terminal 100.

Similarly, with reference to FIG. 10(b), when the external charging cable 300 is not connected to the mobile terminal 100 and the amount of remaining battery life of the power supply unit 190 of the mobile terminal 100 is small (namely, smaller than a predetermined amount), the mobile terminal 100 can be charged by the earphone 200. In other words, when the amount of remaining battery life of the power supply 190 of the mobile terminal 100 is larger than a predetermined amount, the mobile terminal 100 can use the battery of the power supply unit 190, but when the amount of remaining battery life is smaller than a threshold, the mobile terminal 100 can be charged through a cable-type battery 210 connected to the earphone port 161.

Figure 11:
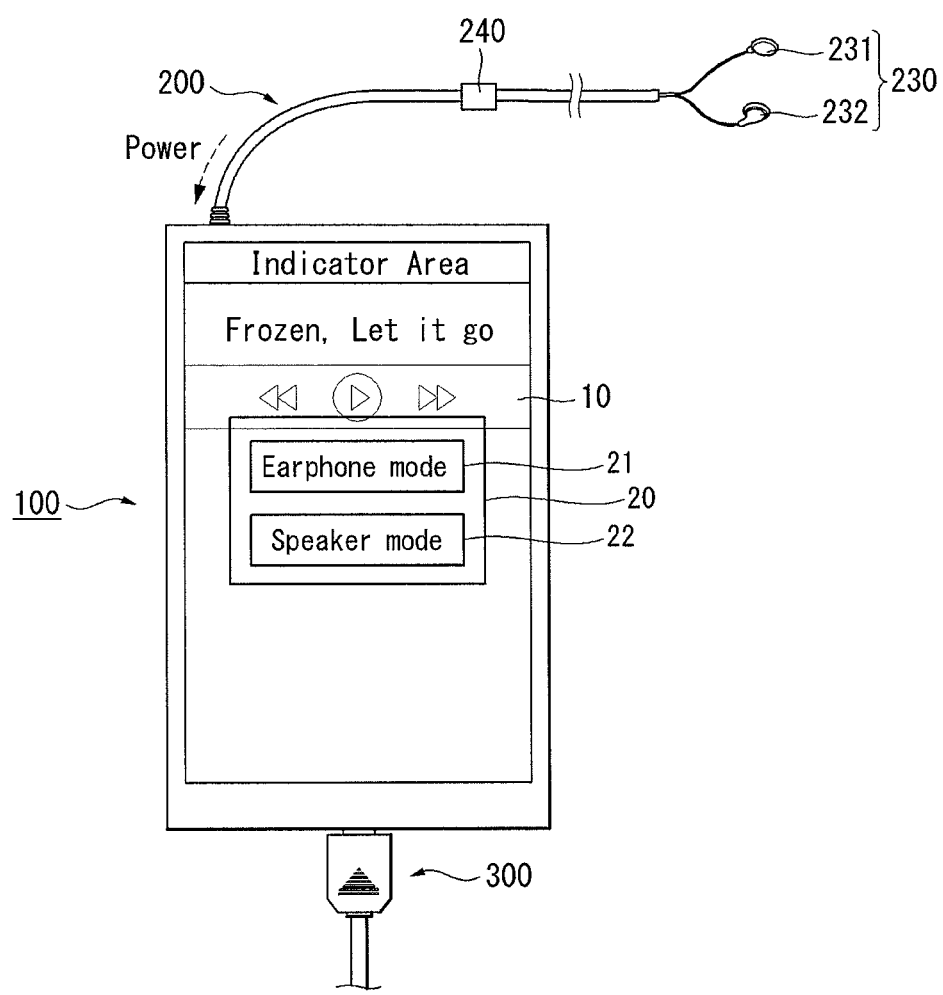
FIGS. 11 to 18 includes overviews illustrating a method for selecting an audio output path when an audio output function is performed while an earphone with a cable-type battery is used as an auxiliary battery of a mobile terminal.

FIGS. 11 to 18 illustrate a method for selecting an audio output path when an audio output function is performed while an earphone with a cable-type battery is used as an auxiliary battery of a mobile terminal. With reference to FIG. 11, the controller 180 detects insertion of an earphone with a cable-type battery into the mobile terminal. The controller 180 monitors the mobile terminal 100 being charged through the earphone with a cable-type battery. In the meantime, if an input for playing an MP3 file in the mobile terminal 100 is received, the controller 180 can display a menu for selecting an audio output path on the display unit 151.

The menu 20 can include an earphone mode 21 and a speaker mode 22. The earphone mode 21 indicates a mode where an audio sound from the mobile terminal 100 is output through the speaker of the earphone while the speaker mode 22 indicates that the audio sound is output through the speaker embedded in the mobile terminal 100. The controller 180 can output an audio sound based on the selected menu.

Figure 12:
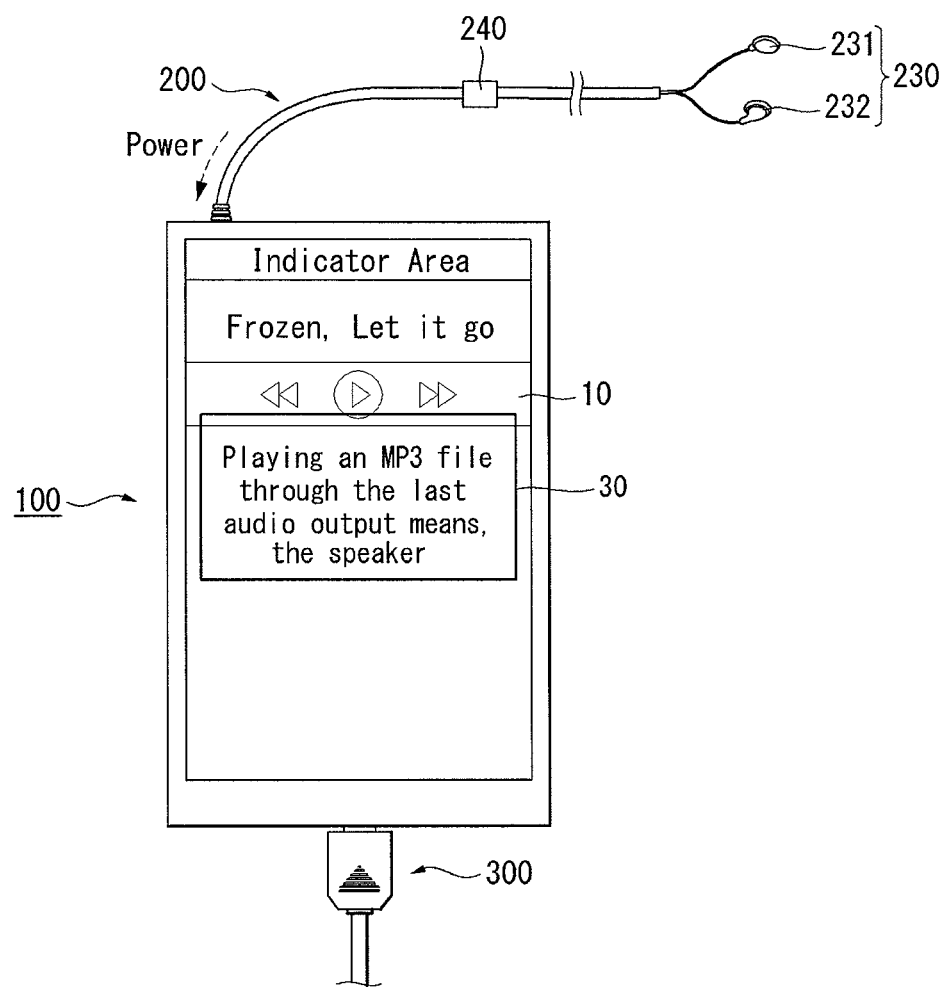

With reference to FIG. 12, the controller 180 detects insertion of an earphone with a cable-type battery into a mobile terminal and monitors the mobile terminal 100 being charged through the earphone with a cable-type battery. Afterwards, when an input for carrying out an MP3 function in the mobile terminal 100 is received, the controller 180 displays information 30 notifying of outputting a sound through a last used audio output path on the display unit 151 and outputs the sound through the last used audio output path.

Further, the last used audio output path refers to the path through which an audio sound output from the mobile terminal 100 has been output before the MP3 function is performed. Therefore, when an audio sound is output through the earphone before carrying out the MP3 function, the result of playing the MP3 file can be output through the speaker of the earphone. Also, when an audio sound is output through the speaker embedded in the mobile terminal 100 before playing the MP3 file, the result of playing the MP3 file can be output through the speaker 152 embedded in the mobile terminal 100. Both of the cases can be implemented in a situation where an earphone with a cable-type battery is inserted into the earphone port 161 of the mobile terminal 100 and the mobile terminal 100 is charged through the earphone.

Figure 13:
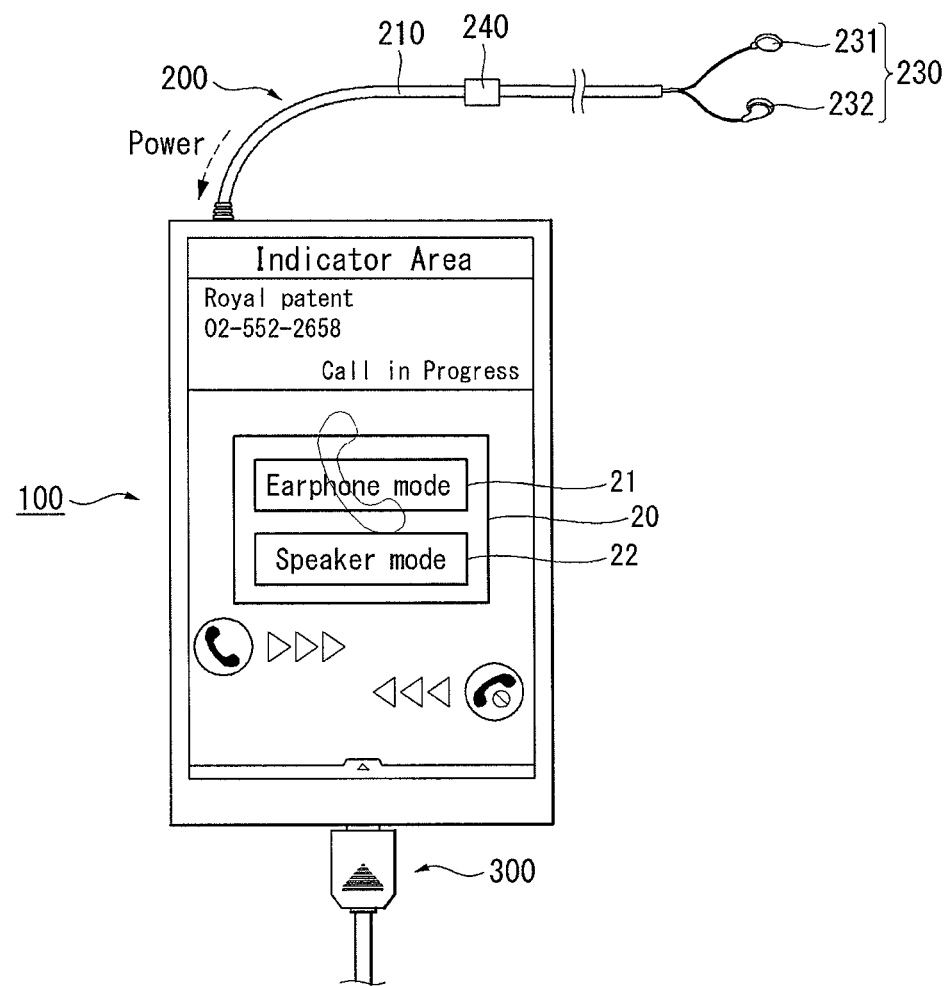

With reference to FIG. 13, the controller 180 detects insertion of an earphone with a cable-type battery into a mobile terminal and monitors the mobile terminal 100 being charged through the earphone with a cable-type battery. Afterwards, the controller 180 can receive a request for connecting to an incoming call from the outside. When an input accepting the request for connecting to an incoming call is received, the content spoken by the other party can be converted into and output as an audio sound. In this instance, too, a menu for selection an audio output path can be displayed on the display unit 151 and the content of the call by the other party can be output through the selected path.

Figure 14:
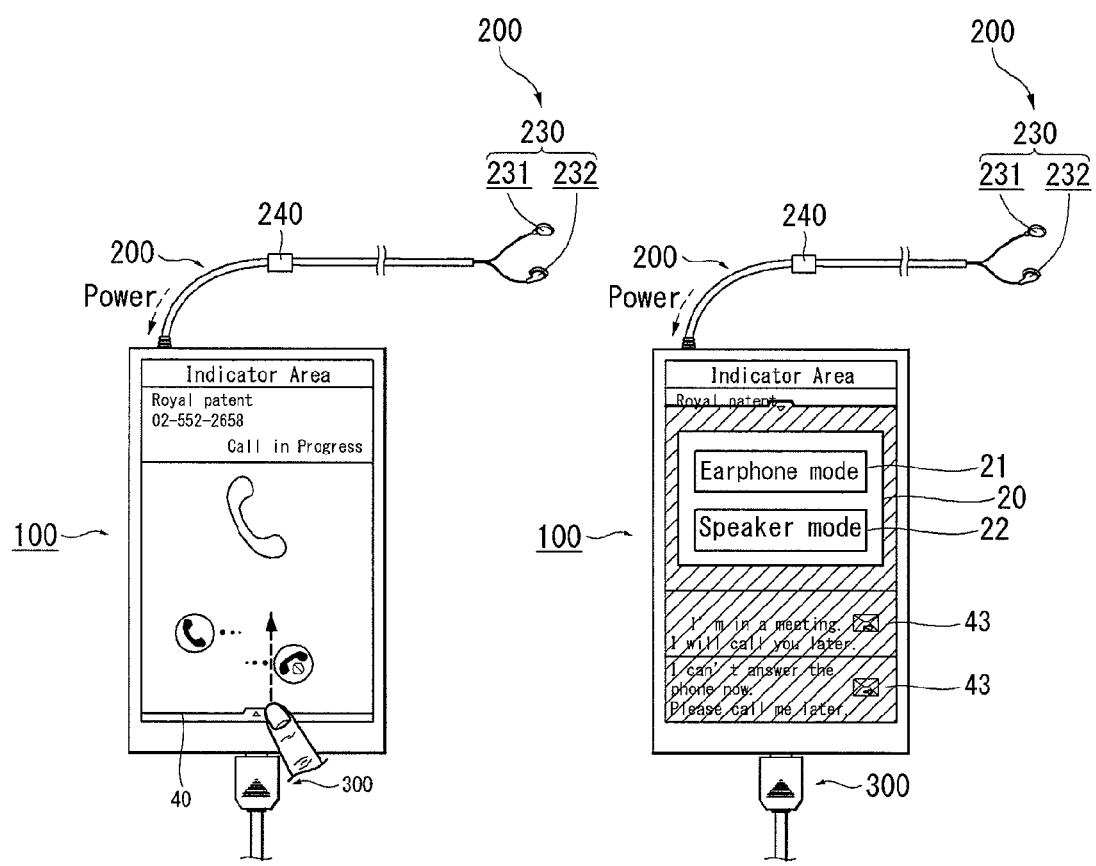

With reference to FIG. 14, a status bar 40 can be displayed on the bottom of the display unit 151 while the screen for requesting a connection to an incoming call according to the embodiment of FIG. 13 is displayed. When a touch input is dragged on the status bar 40, the status bar 40 can be slid upward to be displayed. A function button 43 for delivering unavailability for the call to the other party in the form of a message can be displayed on the slid status bar 40. The controller 180 can display a menu 20 for selecting the aforementioned audio output path on the status bar 40. The controller 180 can output an audio sound through the audio output path selected from the menu 20.

Figure 15:
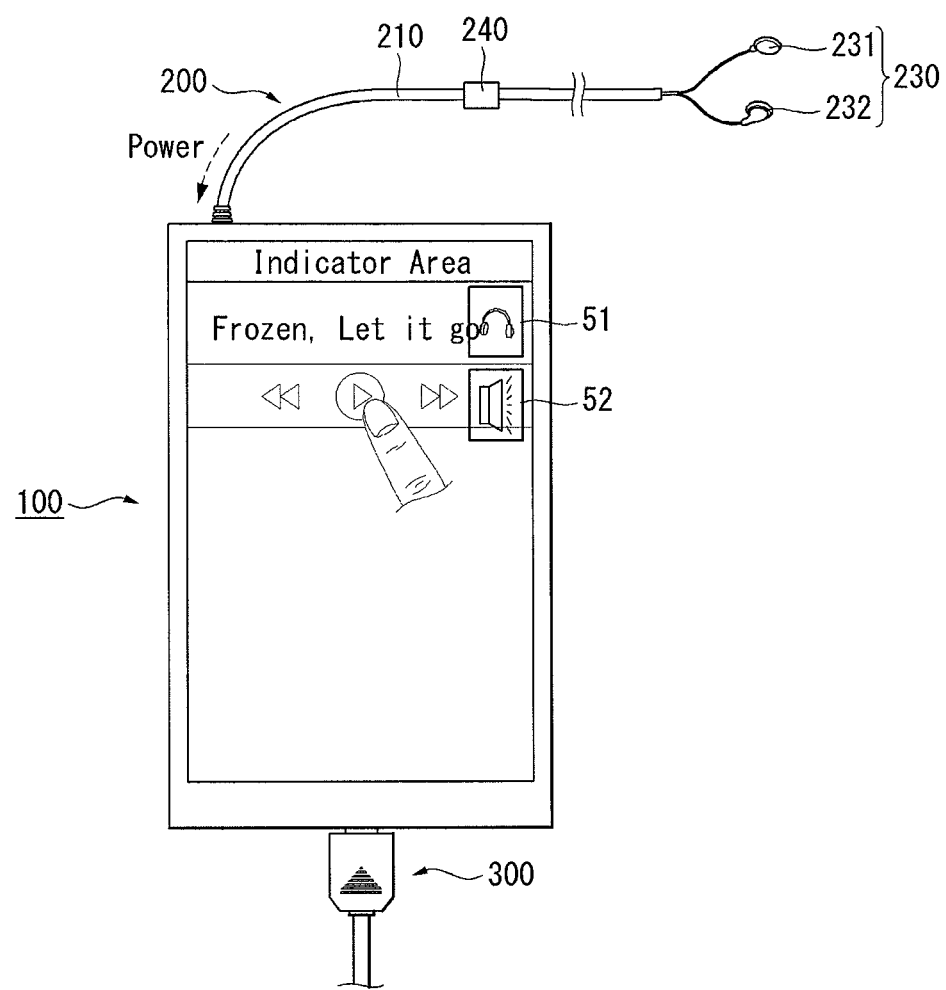

With reference to FIG. 15, the controller 180 detects insertion of an earphone with a cable-type battery into a mobile terminal and monitors the mobile terminal 100 being charged through the earphone with a cable-type battery. Afterwards, when the mobile terminal 100 is required to output an audio sound, the controller 180 can display a graphic object 51, 52 corresponding to an available audio output mechanism on the display unit 151 before outputting the audio sound. The controller 180 can output an audio sound through an audio output path corresponding to the selected graphic object 51, 52. In another instance, the controller 180 automatically selects a particular audio output path before outputting the audio sound by taking account of the user's situation and displays a graphic object corresponding to the particular audio output path, thereby notifying the user that an audio sound is supposed to be output through a particular audio output path.

Figure 16:
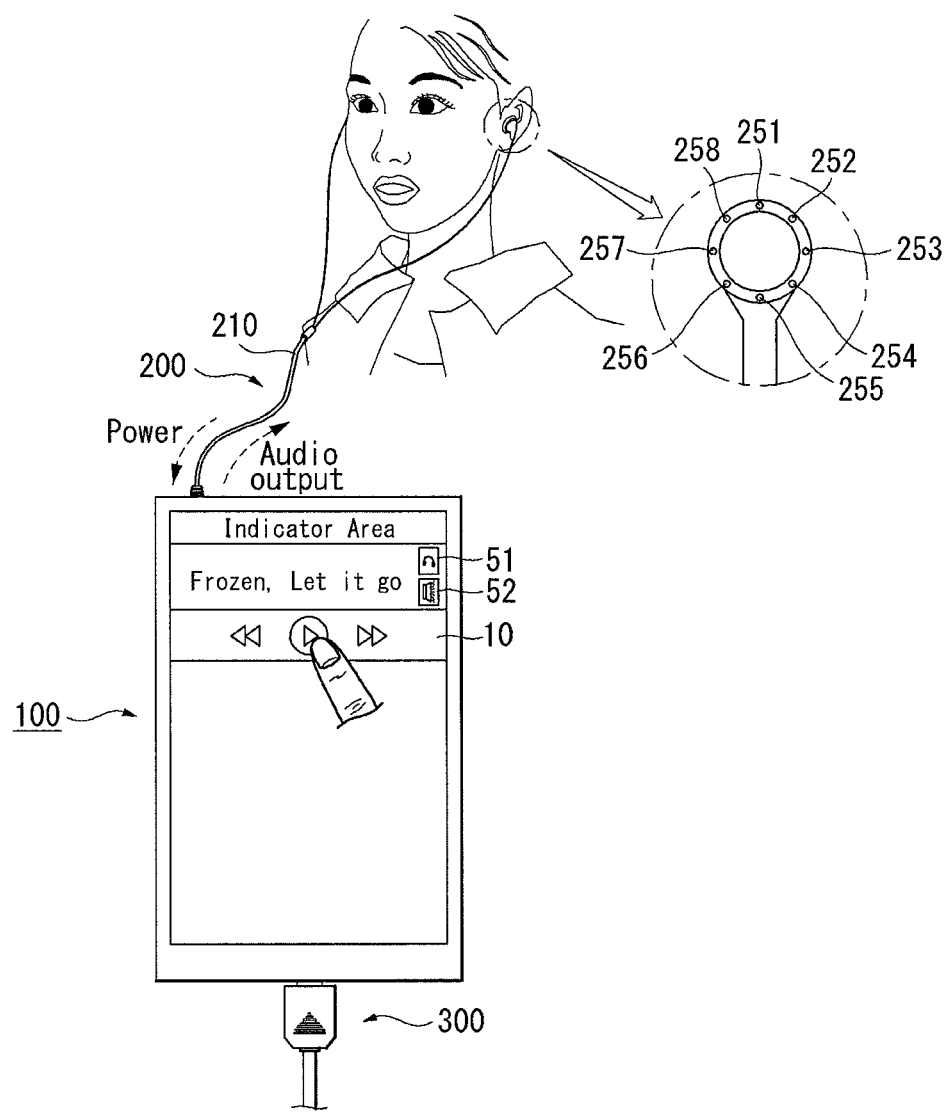

With reference to FIG. 16, a mobile terminal 100 according to one embodiment of the present invention can determine an audio output path depending on whether the user wears an earphone. While the mobile terminal 100 is charged through the cable-type battery, the mobile terminal 100 can carry out an audio output function. In this instance, based on the fact that the user wears the earphone, the controller 180 can infer the user's intention to use the earphone as an audio output path.

For example, the earphone 200 with a cable-type battery applied to implement a method for controlling a mobile terminal according to one embodiment of the present invention can further comprise an earphone wearing detection module. The earphone wearing detection module can comprise sensors 251, 252, 253, 254, 255, 256, 257 and 258 disposed on the ear contacting surface of the earphone. Based on the sensing information of the sensors, the earphone wearing detection module can check whether the user has put the earphone speaker 231, 232 is his or her ear.

A pressure sensor, electrostatic capacity detection sensor, thermometer, and so on can be used as a sensor for detecting the wearing of an earphone. The present invention is not limited to these identified sensors as any type of capable of detecting a contact and of small size can be employed. Also, it should be noted that depending on the corresponding sensing range, the number of sensors and installation positions thereof can be adjusted.

The information obtained from the earphone wearing detection module is provided to the controller 180 of the mobile terminal 100. If the information shows that the number of contacts is larger than a predetermined value (for example, 5 out of 8 sensors) the controller 180 determines that the user is wearing the earphone. If the number of contacts is smaller than the predetermined value, the controller 180 concludes that the user is not wearing the earphone. When the controller 180 determines based on the sensing information of the sensors that the user is not wearing the earphone, as described above, a menu for selecting an audio output path can be provided or the user can be notified that an audio sound can be output through a last used audio output path.

Figure 17:
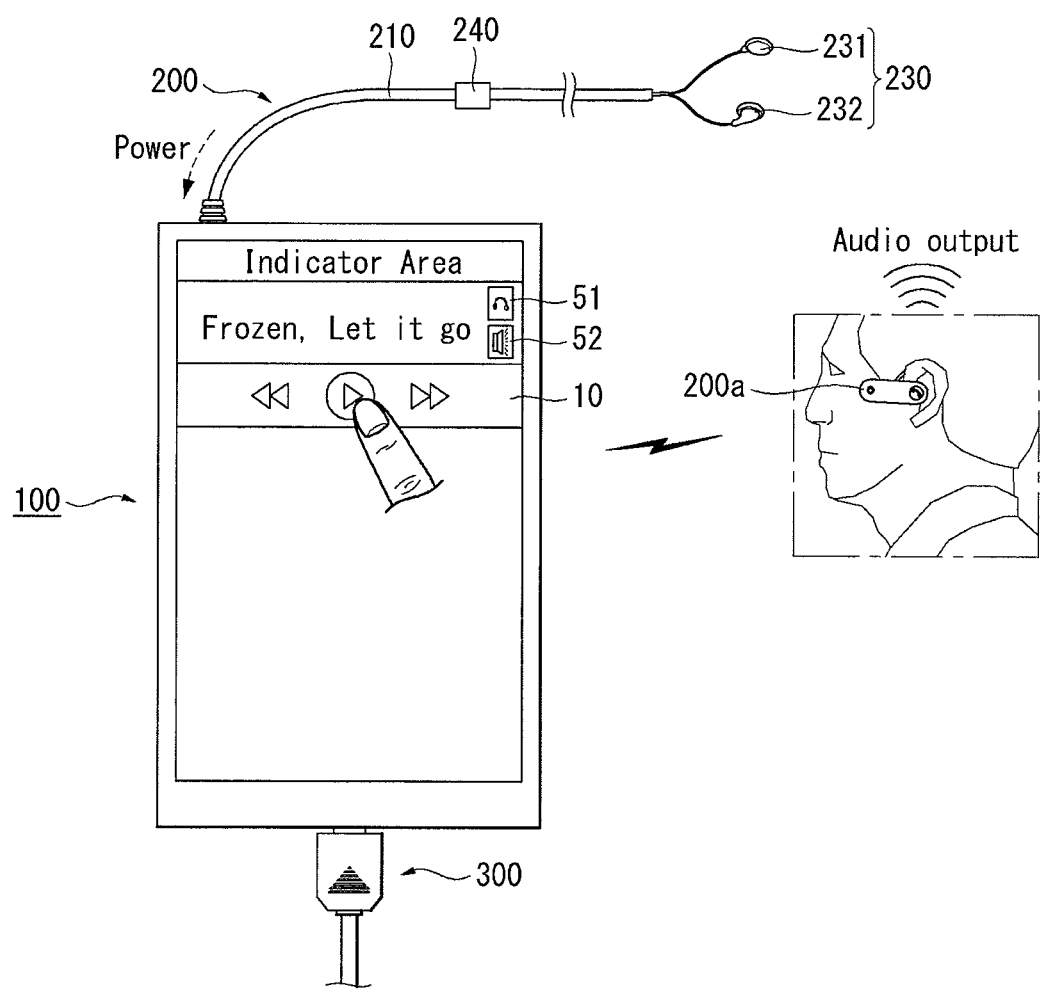

Similar to FIG. 16, another example where an audio output path is selected from interpretation of the user's intention and an audio sound is output through the selected audio output path will be described with reference to FIG. 17. For example, the mobile terminal 100 can perform pairing with a short range communication earphone, such as a Bluetooth® earphone 200a, through the short range communication module 114. The Bluetooth® earphone 200a can be used as an audio output path of the mobile terminal 100 or only stay in the pairing state.

Now it is assumed that regardless of using a Bluetooth® earphone 200a, an earphone 200 with a cable-type battery is inserted into the earphone port 161 and the mobile terminal 100 is charged through the cable-type battery. Afterwards, when an audio output function is performed, the controller 180 detects the pairing state of the Bluetooth® earphone 200a and infers that the user intends to use the Bluetooth® earphone 200a as the audio output path. In other words, in this instance, a mechanism available for the audio output path includes the earphone 200 with a cable-type battery, a speaker 152 embedded in the mobile terminal 100, and the Bluetooth® earphone 200a. While the short range communication earphone has been described as a Bluetooth® earphone, it is understood that other short range communication earphones could be used instead. In this instance, too, a menu with which the user can select the audio output path can be provided.

Figure 18:
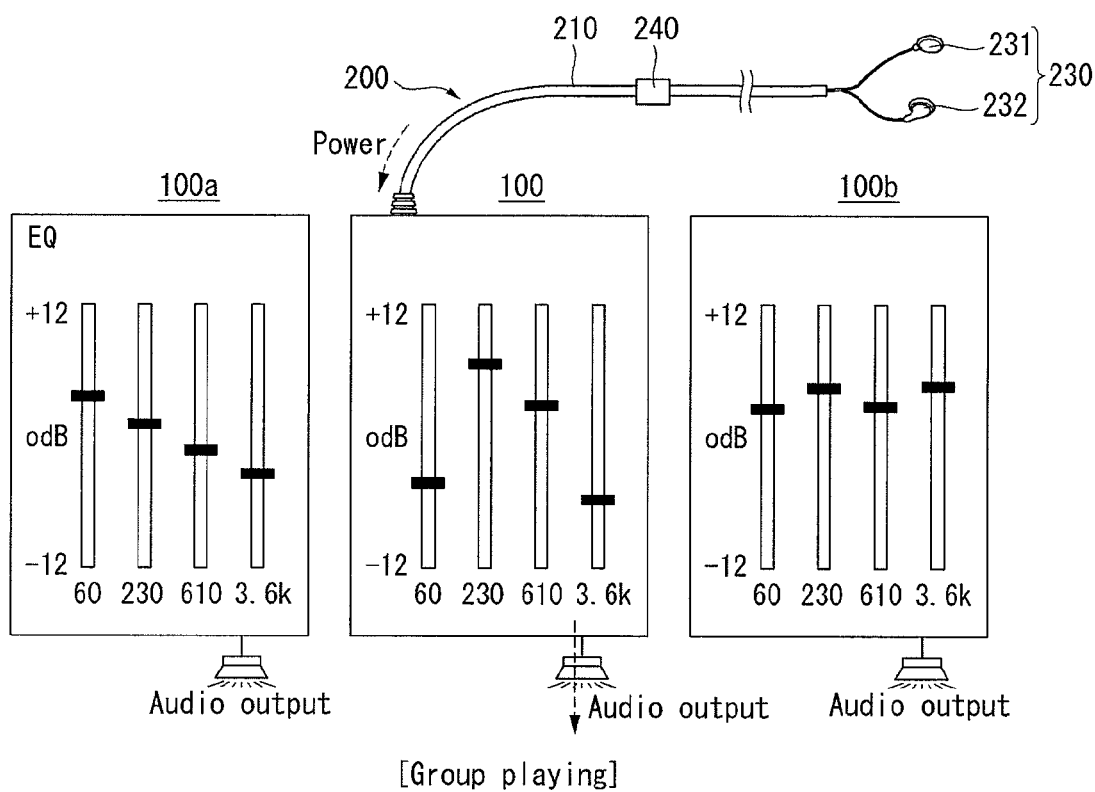

Similar to FIG. 16, another example where an audio output path is selected from interpretation of the user's intention and an audio sound is output through the selected audio output path will be described with reference to FIG. 18. With reference to FIG. 18, the mobile terminal 100 can output an audio sound by employing a group play with other terminals 100a, 100b. For example, while the mobile terminal 100 is connected to other terminals 100a, 100b through a wireless communication interface, an audio sound generated from the mobile terminal 100 can be output through the speaker 152 embedded in the mobile terminal 100 and the speakers embedded in other terminals. In this instance, a single music file can be output through three speaker channels.

While an earphone with a cable-type battery is inserted, the controller 180 can recognize that the mobile terminal 100 is charged through the cable-type battery and receive an input for carrying out a group play through the mobile terminal 100 and other terminals 100a, 100b. As the group play is performed, the controller 180 can select the embedded speaker 152 of the mobile terminal 100 instead of the earphone 200 with a cable-type battery as the audio output path to output an audio sound. The number of other terminals participating in the group play is an illustrative example, and the present invention is not limited to the aforementioned two terminals.

Up to this point, embodiments haven been described where, when the mobile terminal receives an input for carrying out the audio output function while an earphone with a cable-type battery is inserted into the mobile terminal and the cable-type battery charges the mobile terminal, an audio sound is output through an appropriate audio output path determined from interpretation of the user's intention, or the audio output is controlled by a menu with which the user selects the audio output path.

Figure 19:
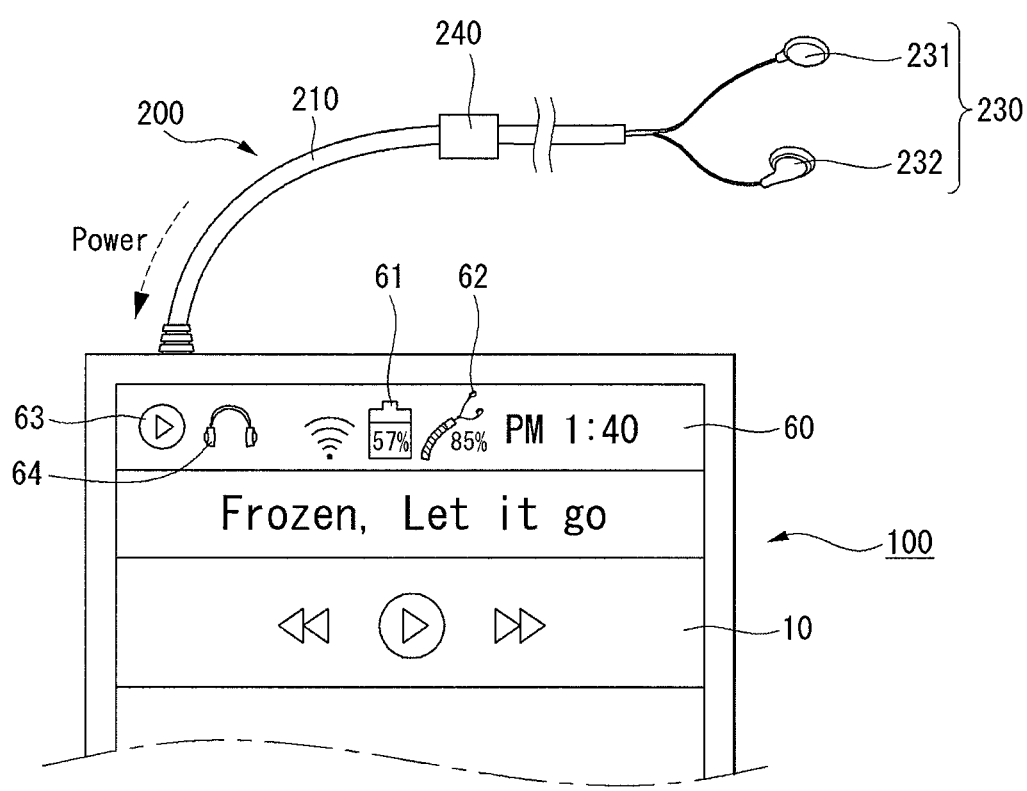
FIGS. 19 to 21 illustrate an example of displaying a graphic object related to a cable-type battery when an earphone with the cable-type battery is plugged into a mobile terminal.
Figure 20:
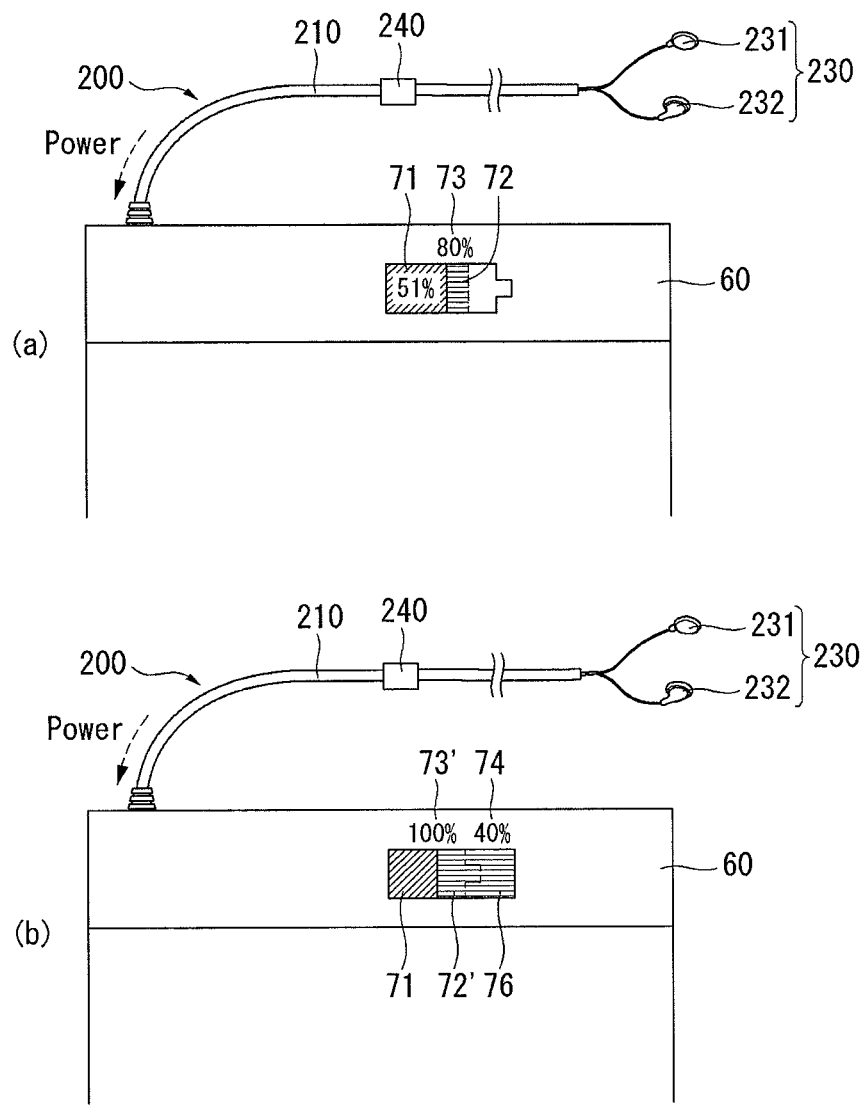
Figure 21:
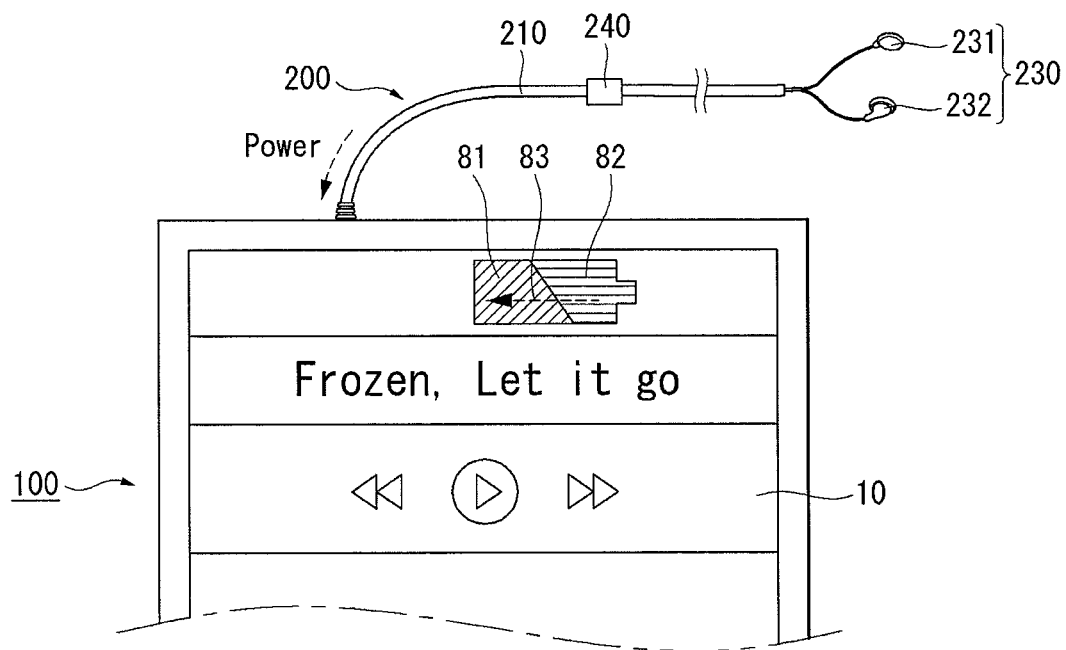

In what follows, an example will be described of displaying the amount of remaining battery life by using a predetermined graphic object as the aforementioned cable-type battery is inserted. FIGS. 19 to 21 illustrate an example of displaying a graphic object related to a cable-type battery when an earphone with the cable-type battery is plugged into a mobile terminal. With reference to FIG. 19, the controller 180 can display the amount of remaining battery life of the power supply unit 190 of the mobile terminal 100 by using a first graphic object 61. The first graphic object 61 can be displayed on the indicator area 60 of the display unit 151. The indicator area 60 is intended for displaying status information of the mobile terminal 100. An indicator 63 indicating that a music play function is under execution, an indicator 64 indicating insertion of an earphone, Wi-Fi connection state, time information, and so on can be displayed on the indicator area 60. Along with the first graphic object 61 which represents the amount of remaining battery life, a second graphic object 62 can be displayed on the indicator area 60.

The first graphic object 61 can be displayed separately from the second graphic object 62. For example, the first graphic object 61 is in the form of a battery, but the second graphic object 62 can assume a cable shape. Meanwhile, the first 61 and the second graphic object 62 can represent the amount of remaining battery life by using colors or Arabic numbers.

In what follows, an example will be described in more detail where an amount of remaining battery life or an amount of battery charged due to the power supply unit 190 of the mobile terminal 100 and the cable-type battery is displayed in a more intuitive manner by using a graphic object when an earphone with the cable-type battery is inserted into the mobile terminal.

It is assumed in FIG. 19 that a separate graphic object is displayed to represent the amount of remaining battery of the cable-type battery embedded in the earphone 200. With reference to FIG. 20, however, the controller 180 can display two different power sources by using a single graphic object. Also, instead of showing only the remaining battery life of the cable-type battery, the controller 180 can display the amount of battery life as the power supply unit 190 of the mobile terminal 100 is charged by the cable-type battery.

For example, with reference to FIG. 20(a), the controller 180 can display an area 71 filled with a first color indicating the amount of remaining battery life (51%) of the power supply unit 190 in the first graphic object. Similarly, the controller 180 can display an area 72 filled with a second color indicating the amount of battery life charged by the cable-type battery 210 in the second graphic object. Also, the controller 180 can calculate the total amount of battery life 73 (80%) available for the mobile terminal 100 by including the amount of battery life charged by the cable-type battery and display the calculated amount along with the first graphic object. Accordingly, the amount of battery life charged by the cable-type battery 210 can be monitored in real-time through the first graphic object.

With reference to FIG. 20(b), there are times when the amount of battery life charged by the cable-type battery 210 for the power supply unit 190 of the mobile terminal 100 exceeds the maximum electric capacity 73' (100%) of the power supply unit 190. In this instance, the controller 180 extends the first graphic object in a longitudinal direction with respect to the amount of excess over the maximum capacity so that a virtual battery life 76 charged continuously by the cable-type battery 210 can be displayed. The reference symbol 71 corresponds to the capacity stored in the power supply unit 190 of the mobile terminal 100, and the reference symbol 72' corresponds to the capacity charged by the cable-type battery 210 and reference symbol 74 refers to the overcharge amount of the virtual battery life.

With reference to FIG. 21, when the power supply unit 190 of the mobile terminal 100 is charged by the earphone with a cable-type battery, the controller 180 can display an indicator 83 representing a charging direction by using a graphic object for displaying the amount of remaining battery life. For example, the left area 81 of the graphic object for displaying the amount of remaining battery life corresponds to the power supply unit 190 of the mobile terminal 100, while the right area corresponds to the cable-type battery of the earphone. As shown in FIG. 21, by displaying an arrow pointing to the left, the user can recognize intuitively that the cable-type battery is charging the power supply unit 190 of the mobile terminal 100.

Figure 22:
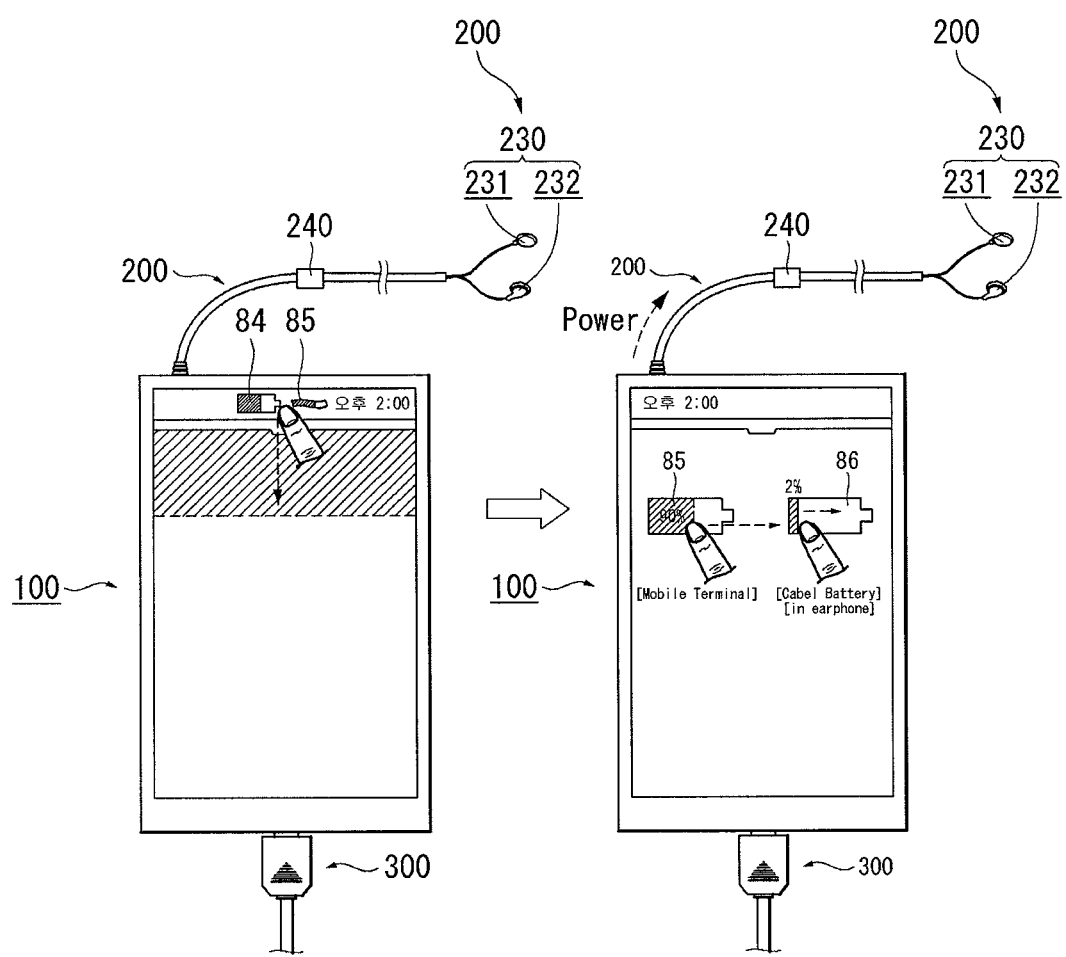
FIG. 22 is an example illustrating controlling a charging direction by operation of a graphic object.

FIG. 22 is an example illustrating controlling a charging direction by operation of a graphic object. With reference to FIG. 22, when an earphone with a cable-type battery is inserted into the mobile terminal 100, a first graphic object 84 and a second graphic object 85 for representing the amount of remaining battery life can be displayed on the indicator area of a touch screen (display unit 151). When a touch input dragging the indicator area downwards is applied, the controller 180 can slide a status window to be displayed on the touch screen 151. The touch input can be a drag input to move downwards the first graphic object 84 or the second graphic object 85 displayed on the indicator area. The controller 180 can display the first graphic object 84 and the second graphic object 85 separately on the slid status window. At this time, the first graphic object 84 represents the amount of remaining battery life of the mobile terminal 100 while the second graphic object 85 represents the amount of remaining battery life of the cable-type battery of the earphone.

When a drag input which moves the touch input on the first graphic object 84 to the second graphic object 85 is received, the controller 180 can change the charging direction so that charging can be performed on the cable-type battery corresponding to the second graphic object 85 from the power supply unit 190 of the mobile terminal 100 corresponding to the first graphic object 84. In other words, according to one embodiment of the present invention, charging can be controlled by determining a charging direction through a gesture input with respect to the first graphic object 84 and the second graphic object 85 shown in FIG. 22.

Meanwhile, while the embodiments discussed above assumed that if an earphone is inserted, a cable-type battery is employed to charge the power supply unit 190 of the mobile terminal 100. However, the present invention is not so limited. For example, when a drag input, which moves a touch input with respect to the second graphic object 85 toward the first graphic object 84 is received after the earphone is inserted, the cable-type battery may start charging of the power supply unit 190 of the mobile terminal 100.

Figure 23:
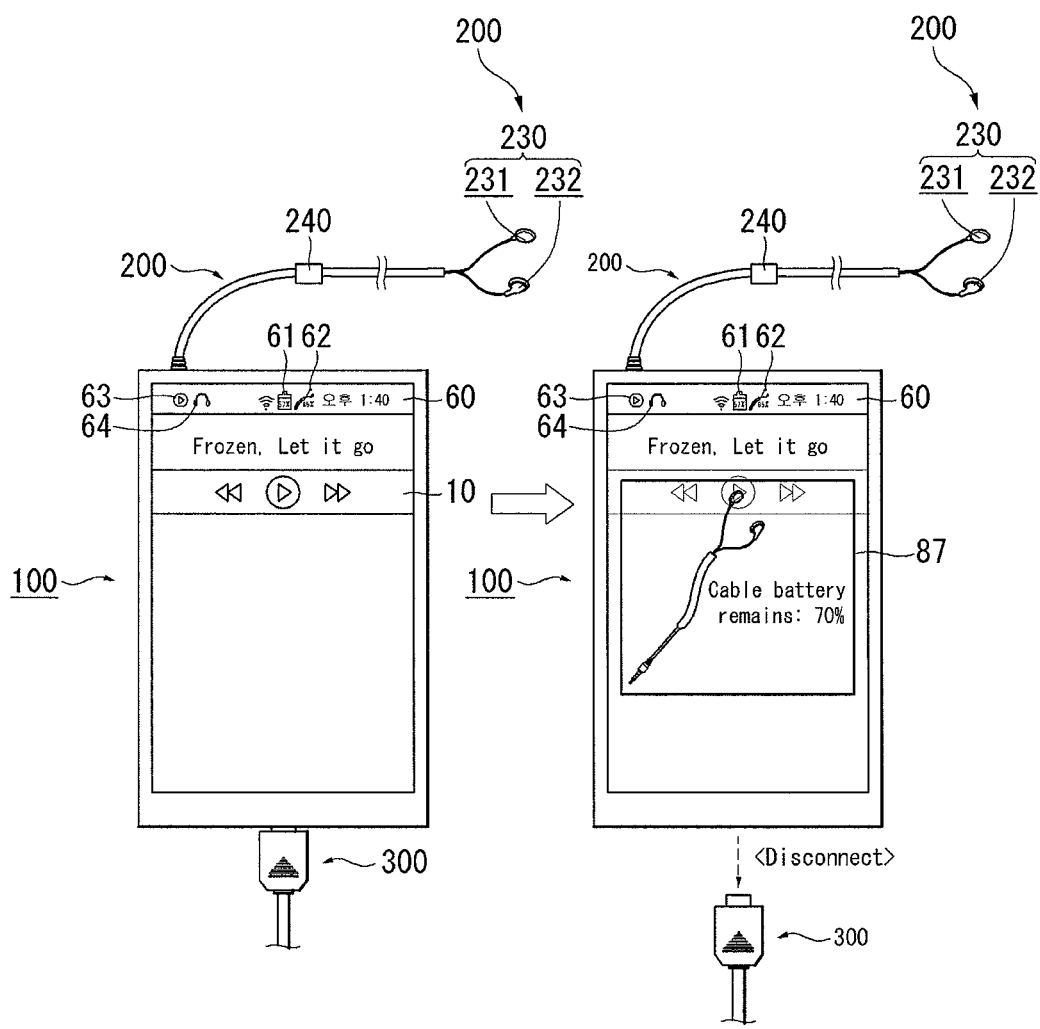
FIG. 23 illustrates an operation of a mobile terminal when an external charger port is disconnected from the mobile terminal.

FIG. 23 illustrates an operation of a mobile terminal when an external charger port is disconnected from the mobile terminal. FIG. 23 assumes that an earphone with a cable-type battery is inserted into the mobile terminal 100 and an external charging cable 300 is connected to the mobile terminal 100. As an audio output function is performed while the power supply unit 190 of the mobile terminal 100 is charged through the cable-type battery, the controller 180 can control the audio sound to be output through either of the earphone and the speaker 152 of the mobile terminal 100. In this situation, if the external charging cable 300 is disconnected, the controller can display information 87 for checking the amount of remaining battery life of the cable-type battery on the display unit 151.

Meanwhile, when the earphone 200 is disconnected from the mobile terminal 100 in an earphone mode where the mobile terminal 100 outputs an audio sound through the earphone, the controller 180 can output the audio sound through a speaker.

Figure 24:
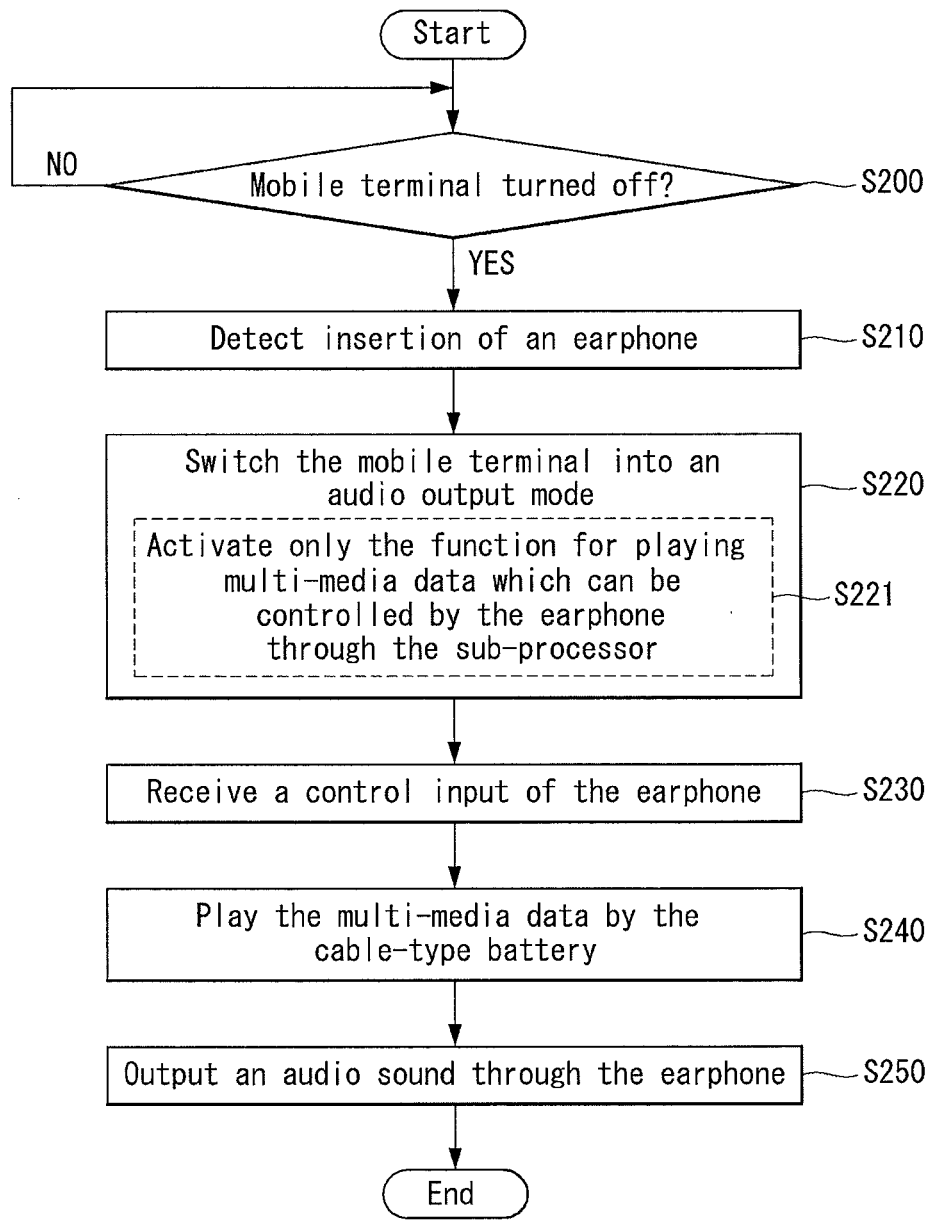
FIG. 24 illustrates a method for controlling a mobile terminal according to one embodiment of the present invention.
Figure 25:
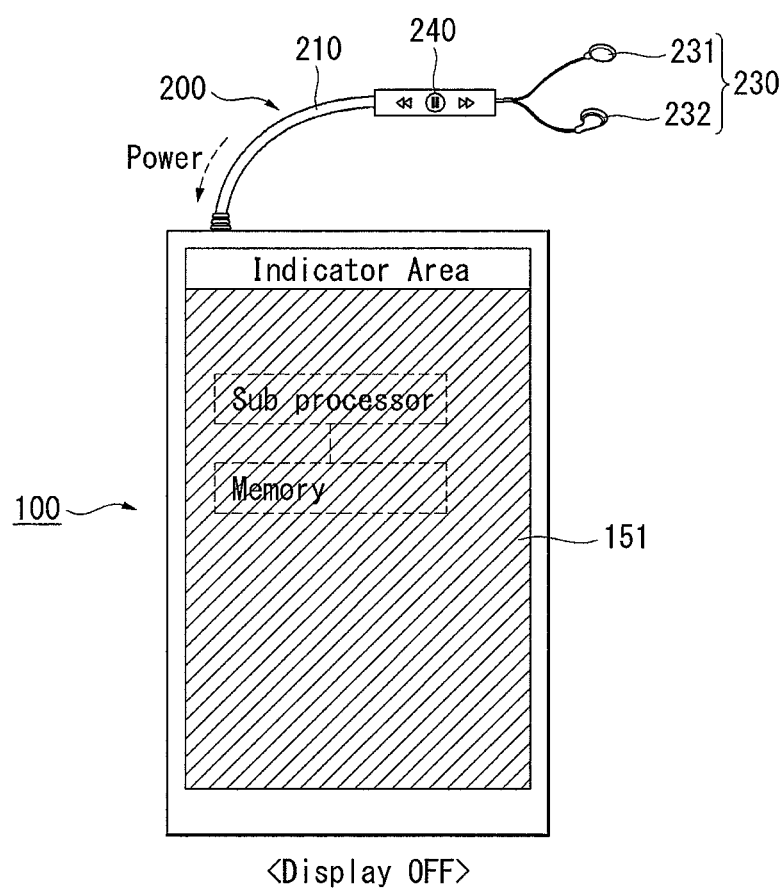
FIG. 25 illustrates an embodiment of FIG. 24.

According to another embodiment, when an earphone is inserted while the mobile terminal 100 is turned off, the mobile terminal 100 is used as an MP3 player by using a cable-type battery embedded in the earphone. FIG. 24 illustrates a method for controlling a mobile terminal according to one embodiment of the present invention. FIG. 25 illustrates an embodiment of FIG. 24. A method for controlling a mobile terminal according to one embodiment of the present invention can be implemented by using a mobile terminal 100 and an earphone with a cable-type battery described with reference to FIGS. 1 to 6.

With reference to FIG. 24, the mobile terminal 100 can be in a power-off state where power for the mobile terminal 100 is turned off (S200). In this instance, the power-off state can indicate a situation where functions of the mobile terminal 100 cannot be performed through a main processor. The sub-processor can be operated by predetermined stand-by power even when the mobile terminal is turned off. As noted above, a mobile terminal 100 according to one embodiment of the present invention can employ a sub-processor in addition to the main processor where the main processor may be referred to as a first controller 180a and the sub-processor may be referred to as a second controller 180b.

The second controller 180b can detect insertion of an earphone while mobile terminal 100 is turned off (S210). Typically, the mobile terminal 100 is unable to perform any operation while the mobile terminal 100 is turned off; however, if insertion of an earphone is detected in the stand-by power, the second controller 180 converts the mobile terminal 100 into an audio output mode (S220). In other words, the second controller 180 wakes up only particular functions related to playing an audio sound, but keeps the remaining functions in a sleep state. Accordingly, only those functions required to play multi-media data and controlled by the earphone through the second controller 180 can be activated (S221). In other words, the aforementioned function can be a function corresponding to an MP3 player.

The second controller 180 can receive a control input through the earphone 200, S230. A control input can be received through the control buttons provided by the earphone 200 (for example, a play button, a fast play button, and the like). In other words, since the touch screen (display unit 151) of the mobile terminal 100 is also turned off, a predetermined input may not be received through the touch screen 151, and an input through a user input unit 123 disposed on the body of the mobile terminal 100 cannot be received, either.

In response to the control input, the second controller 180b can play the multi-media data through the mobile terminal 100 by using the cable-type battery embedded in the earphone 200 as an auxiliary battery (S240). Meanwhile, in the case of the aforementioned embodiment, since the mobile terminal 100 is turned off, the built-in speaker 152 of the mobile terminal 100 is also in the power-off state. Accordingly, the second controller 180b can output an audio sound according to the play of the multi-media data through only the earphone 200 (S250).

FIG. 25 illustrates an embodiment of FIG. 24. The sub-processor corresponds to the aforementioned second controller 180b. If the earphone 200 is inserted while the mobile terminal 100 is turned off, the second controller 180b detects the insertion. When a control input is received through a control mechanism 240 of the earphone, the second controller 180b can play a music file stored in the memory 170. At this time, the cable-type battery embedded in the earphone 200 is used as an auxiliary battery.

The embodiments above assume that a cable-type battery is embedded in the earphone. It was also assumed that an audio output function is performed while the earphone with the cable-type battery is connected to the mobile terminal 100. However, the present invention is not limited to the above assumptions. For example, the present invention can also be applied to a case where an earphone is inserted while an audio sound is output through a built-in speaker of the mobile terminal before the insertion of the earphone. In what follows, examples such as described above will be described with reference to related drawings.

Figure 26:
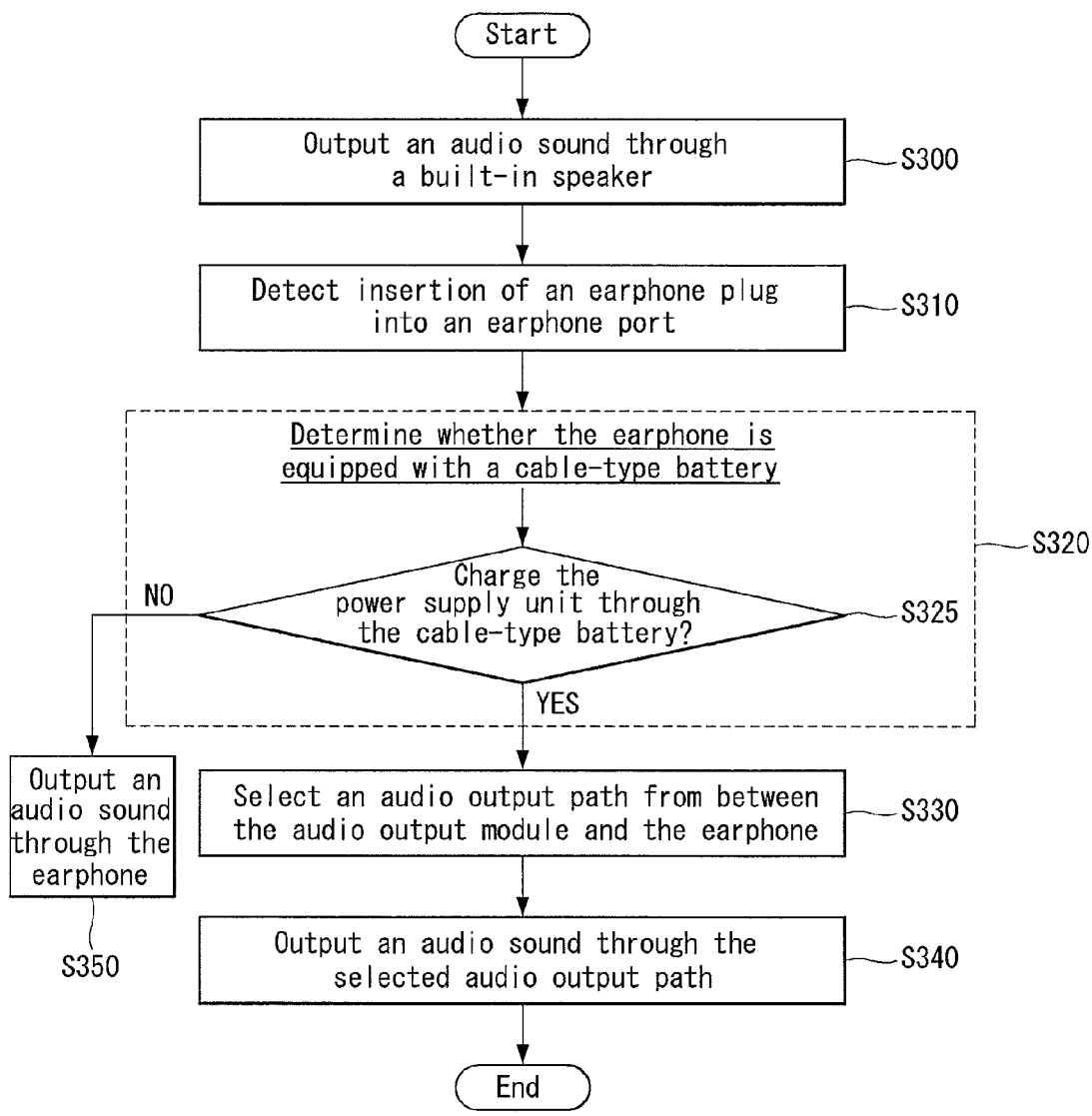
FIG. 26 is a flow diagram of a method for controlling a mobile terminal according to one embodiment of the present invention.
Figure 27:
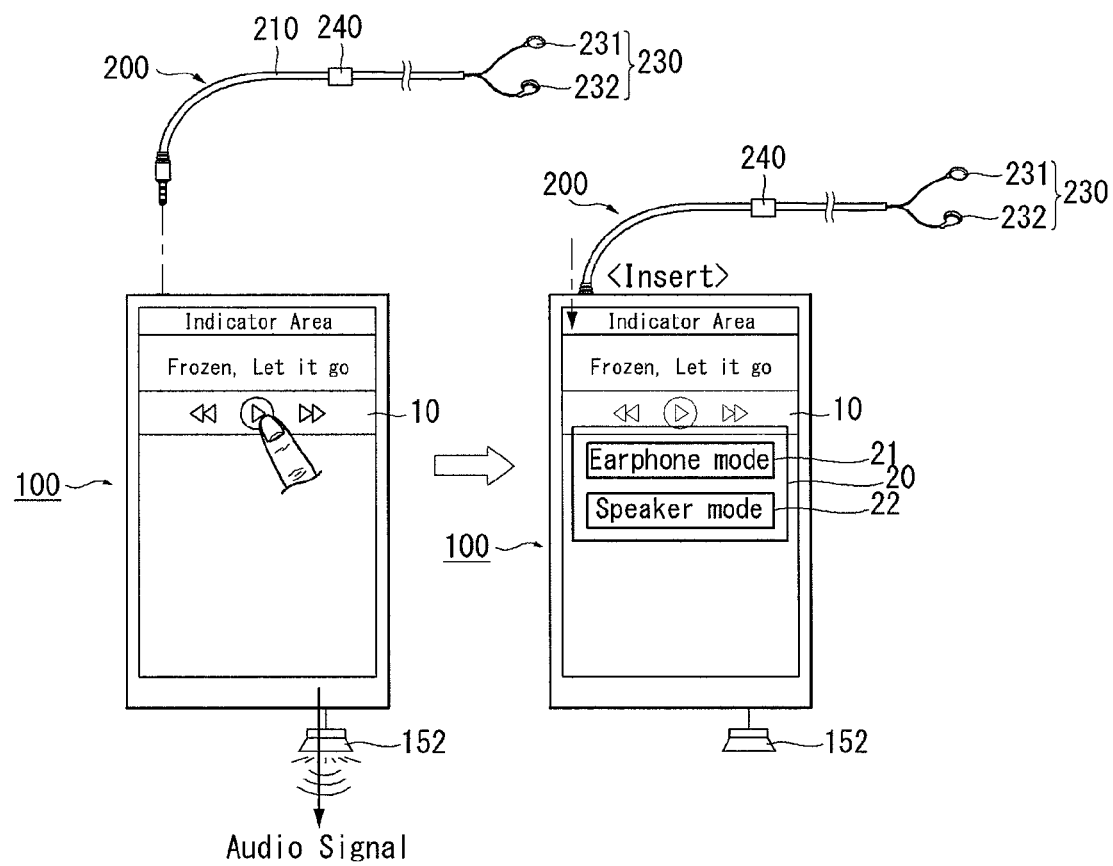
FIG. 27 illustrates an embodiment of FIG. 26.

FIG. 26 is a flow diagram of a method for controlling a mobile terminal according to one embodiment of the present invention, and FIG. 27 illustrates an embodiment of FIG. 26. A method for controlling a mobile terminal according to one embodiment of the present invention can be implemented by using a mobile terminal 100 and an earphone with a cable-type battery described with reference to FIGS. 1 to 6.

With reference to FIG. 26, the mobile terminal 100 can output an audio sound according to the execution of an audio output function through a built-in speaker (refer to 152 of FIG. 1), S300. The audio output function is the same as described above. The controller 180 can detect insertion of the plug of an earphone into the earphone port (161 of FIG. 1) (S310). In other words, the controller 180 can detect insertion of the plug of the earphone into the earphone port 161 while an audio sound is output through the speaker of the mobile terminal 100.

The following operations are allowed in the mobile terminal when an earphone is inserted while an audio sound is output through the speaker. First, the mobile terminal can temporarily stop audio output. Before an earphone is inserted, a built-in speaker of the mobile terminal is the only audio output path available. However, when an earphone is inserted, audio output through the earphone is made possible. Therefore, audio output is temporarily stopped, and as an input for subsequent audio output is received, an audio sound can be output through the earphone.

Second, as the earphone is inserted, the mobile terminal switches the audio output path from the speaker to the earphone, thereby outputting an audio sound through the earphone.

Third, when the earphone is equipped with a cable-type battery, the user intends to charge the power supply unit of the mobile terminal through the cable-type battery of the earphone. Therefore, considering the function of the earphone, the earphone can be controlled to charge the power supply unit even when the earphone is inserted, while the built-in speaker of the mobile terminal 100 is used to produce audio output.

Accordingly, the controller 180 can determine first whether the earphone inserted into the earphone port 161 of the mobile terminal 100 is an earphone with a cable-type battery (S320). There are various methods available for determining whether an earphone inserted into the earphone port 161 is the kind with a cable-type battery. For example, the controller 180 determines whether the power supply unit (190 of FIG. 1) is charged through a cable-type battery. If it is determined that the power supply unit 190 is charged through the cable-type battery of the earphone (S325), the controller 180 determines that the earphone is equipped with a cable-type battery.

Also, for example, when the earphone is inserted into the earphone port, the controller 180 can display a graphic object for displaying the amount of remaining battery life of the cable-type battery. For example, the graphic object can be displayed on the indicator area of the display unit 151.

The information about the remaining battery life of the cable-type battery can be delivered to the controller 180 of the mobile terminal 180. Therefore, if information about the remaining battery life of the cable-type battery is received, the controller 180 determines that the earphone is equipped with a cable-type battery. The present invention is not limited to the method above as there are various methods for the mobile terminal to determine whether an earphone is equipped with a cable-type battery when the plug of the earphone is inserted into the earphone port of the mobile terminal 100.

When the power supply unit 100 of the mobile terminal 100 is charged through a cable-type battery ((S325):YES), the controller can determine whether to continuously use a built-in speaker of the mobile terminal 100 as an audio output path to output an audio sound or to use a newly inserted earphone as the audio output path (S330). Next, the controller 180 can output the audio sound through the audio output path determined. That is, when the user connects an earphone with the cable-type battery to the mobile terminal to charge the power supply unit 190 of the mobile terminal 100 while an audio sound is output through a built-in speaker of the mobile terminal 100, the user may intend to use the earphone as a simple auxiliary battery rather than output the audio sound through the earphone. In this instance, even if the earphone is inserted, the built-in speaker may still be used as the audio output path.

As described above, when an earphone is inserted while a predetermined audio sound is output through the speaker of the mobile terminal 100, the audio output path can be so selected by taking into account the user's intention that the audio sound can be output through the selected audio output path. Regarding a process of selecting the audio output path, previously disclosed embodiments for selecting an audio output path can be applied. When the earphone which has been inserted into the earphone port 161 is not an earphone with a cable-type battery ((S325):NO), the controller 180 can switch the audio output path from the speaker 152 of the mobile terminal 100 to the earphone 200 and output the audio sound through the earphone S350.

With reference to FIG. 27, the controller 180 can output an audio sound according to playing of an MP3 file through the built-in speaker 152 when an earphone is not inserted into the mobile terminal. If an earphone 200 is inserted while the audio sound is output, the type of the earphone is first checked. As described above, when the power supply unit 190 is charged through the earphone, the controller 180 determines that the earphone is the kind with a cable-type battery and provides a method for selecting an audio output path to the display unit 151. Also, when the power supply unit 190 of the mobile terminal 100 is charged through the cable-type battery, the controller 180 determines that the inserted earphone 200 is used for charging and controls the speaker 152 to continuously output the audio sound.

Meanwhile, if it is determined that the inserted earphone is the kind with a cable-type battery, the mobile terminal 100 according to one embodiment of the present invention can monitor the amount of remaining battery life of the cable-type battery and select an audio output path according to the amount of remaining battery life. For example, if the amount of remaining battery life of the cable-type battery is smaller than a predetermined value, the controller 180 can select the speaker of the mobile terminal 100 as the audio output path. When the amount of remaining battery life of the cable-type battery is small, the controller 180 can perform the function of charging the cable type battery but let the speaker output the audio sound. Alternatively, if the amount of remaining battery life of the cable-type battery exceeds the predetermined value, the controller 180 can control the mobile terminal 100 to output the audio sound through the earphone with the cable-type battery.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a terminal body;
   a display unit;
   an audio output module located in the terminal body;
   a power supply unit located in the terminal body;
   an earphone port formed on one side of the terminal body; and
   a controller configured to:
   detect insertion of a plug of an earphone having a cable-type battery into the earphone port,
   detect the power supply unit being charged by the cable-type battery of the earphone,
   receive an input for performing an audio output function while the charging the power supply unit is maintained,
   display a menu on the display unit for selecting at least one of the audio output module or the earphone inserted in the earphone port as an audio output path to output audio sound according to the audio output function, and
   output the audio sound through the earphone while the power supply unit is charged by the cable-type battery of the earphone, in response to selecting the earphone as the audio output path,
   wherein the controller comprises a main processor configured to operate while the mobile terminal is turned on and a sub-processor configured to operate from stand-by power while the mobile terminal is turned off, and
   wherein, when insertion of the plug of the earphone into the earphone port is detected while the mobile terminal is turned off, the sub-processor activates only the audio output function for playing multi-media data.

2. The mobile terminal of claim 1, wherein the audio output function comprises at least one of playing a music file, receiving an incoming call, and generating an alarm.

3. The mobile terminal of claim 1, wherein the audio output module comprises a speaker, and
wherein the controller is configured to control the audio output module to output the audio sound through the speaker while the earphone plug is inserted into the earphone port.

4. The mobile terminal of claim 1, wherein the controller is configured to display on the display unit information indicating a last used audio output path before outputting the audio sound through the last used audio output path as the selected audio path.

5. The mobile terminal of claim 4, wherein the information comprises a graphic object associated with the last used audio path.

6. The mobile terminal of claim 1, wherein the earphone includes at least one sensor configured to output a sensing signal indicating whether the earphone is being worn by a user, and
wherein the controller is configured to control the earphone to output the audio sound when the control receives the sensing signal indicating that the earphone is being worn by the user.

7. The mobile terminal of claim 1, further comprising a short range communication module,
wherein, when the mobile terminal is paired with a short range communication earphone through the short range communication module, the controller is configured to control the short range communication module to output the audio sound through the short range communication earphone.

8. The mobile terminal of claim 1, wherein the sub-processor causes only the audio output function for playing the multi-media data to be performed by using the power from the cable-type battery of the earphone.

9. The mobile terminal of claim 1, wherein the display unit includes an indicator area in which a first graphic object is displayed to show remaining battery life of the power supply unit, and
wherein, when the plug of the earphone is inserted into the earphone port, the controller is configured to display the amount of battery life of the cable-type battery of the earphone separately from the remaining battery life of the power supply unit.

10. The mobile terminal of claim 9, wherein the controller is configured to display the amount of battery life of the cable-type battery of the earphone using a second graphic object separately from the first graphic object.

11. The mobile terminal of claim 10, wherein, when a gesture input with respect to the first and second graphic objects is received, the controller is configured to control a charging direction in response to the gesture input so that the power supply unit can charge the cable-type battery or the cable-type battery can charge the power supply unit.

12. The mobile terminal of claim 1, further comprising an external charging port formed on one side of the body and connectable to a charging cable,
wherein the controller is configured to monitor the remaining battery life of the cable-type battery and, when the remaining battery life of the cable-type battery goes below a predetermined value and the mobile terminal is connected to the charging cable, the controller is configured to control the power supply unit so that the power supply unit can charge the cable-type battery.

13. The mobile terminal of claim 12, wherein, when the charging cable is disconnected, the controller is configured to display on the display unit a graphic object representing the remaining battery life of the cable-type battery.

14. The mobile terminal of claim 1, wherein the plug of the earphone comprises a charging port for charging the power supply unit, and
wherein, when insertion of the plug of the earphone into the earphone port is detected, the controller is configured to control the power supply unit so that the cable-type battery can charge the power supply unit through the charging port.

15. The mobile terminal of claim 14, wherein, when there is a partial insertion of the plug into the earphone port such that only the charging port is exposed to the outside of the earphone port, the controller is configured to select the earphone to output the audio sound.

16. A method for controlling a mobile terminal, the method comprising:
detecting, via a controller, insertion of a plug of an earphone with a cable-type battery into an earphone port formed on one side of a body of the mobile terminal;
detecting, via the controller, the power supply unit being charged by the cable-type battery of the earphone;
receiving, via the controller, an input for performing an audio output function while a power supply unit of the mobile terminal is charged through the cable-type battery;
displaying a menu on a display unit for selecting either of an audio output module of the mobile terminal or the earphone inserted in the earphone port as an audio output path to output audio sound according to the audio output function;
outputting the audio sound through the earphone while the power supply unit is charged by the cable-type battery of the earphone in response to selecting the earphone as the audio output path;
operating the mobile terminal, via a main processor of the controller, while the mobile terminal is turned on;
operating the mobile terminal, via a sub-processor of the controller, from stand-by power while the mobile terminal is turned off; and
activating, via the sub-processor, only the audio output function for playing multi-media data when insertion of the plug of the earphone into the earphone port is detected while the mobile terminal is turned off.

* * * * *